(12) United States Patent
Sakurai et al.

(10) Patent No.: US 12,164,902 B2
(45) Date of Patent: Dec. 10, 2024

(54) VEHICLE ELECTRONIC CONTROL SYSTEM, DATA INITIALIZATION METHOD, CENTER DEVICE, VEHICLE MASTER DEVICE, STORAGE MEDIUM FOR STORING INITIALIZATION PACKAGE DISTRIBUTION PROGRAM, AND STORAGE MEDIUM STORING DATA INITIALIZATION PROGRAM

(71) Applicant: DENSO CORPORATION, Kariya (JP)

(72) Inventors: Nao Sakurai, Kariya (JP); Yuzo Harata, Kariya (JP); Kazuhiro Uehara, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 17/967,034

(22) Filed: Oct. 17, 2022

(65) Prior Publication Data
US 2023/0033167 A1    Feb. 2, 2023

Related U.S. Application Data

(63) Continuation of application No. PCT/JP2021/012597, filed on Mar. 25, 2021.

(30) Foreign Application Priority Data

Apr. 21, 2020    (JP) .................................. 2020-075394

(51) Int. Cl.
  *G06F 8/65*    (2018.01)
  *B60W 50/06*    (2006.01)
  *G06F 21/10*    (2013.01)

(52) U.S. Cl.
  CPC .............. *G06F 8/65* (2013.01); *B60W 50/06* (2013.01); *G06F 21/10* (2013.01)

(58) Field of Classification Search
  None
  See application file for complete search history.

(56) References Cited

U.S. PATENT DOCUMENTS

2007/0283110 A1 * 12/2007 Arai ...................... F02D 41/266
                                                                      711/162
2012/0110296 A1    5/2012 Harata
(Continued)

FOREIGN PATENT DOCUMENTS

JP    5152297 B2    2/2013
JP    5375905 B2    12/2013
(Continued)

*Primary Examiner* — Qing Chen
(74) *Attorney, Agent, or Firm* — Harness, Dickey & Pierce, P.L.C.

(57) ABSTRACT

A center device includes: an initialization request receiving unit that receives an initialization request for data stored on a vehicle side; an initialization target specifying unit that specifies initialization target data when the data initialization request is received by the initialization request receiving unit; an initialization campaign information distribution unit that distributes initialization campaign information corresponding to an initialization package for initializing the initialization target data; and an initialization package distribution unit that distributes the initialization package. A vehicle master device includes: an initialization campaign information receiving unit that receives the initialization campaign information from the center device; an initialization package receiving unit that receives the initialization package from the center device; and an initialization execution unit that initializes the initialization target data based on the initialization campaign information and the initialization package.

22 Claims, 38 Drawing Sheets

(56) References Cited

U.S. PATENT DOCUMENTS

| | | | |
|---|---|---|---|
| 2012/0239246 A1 | 9/2012 | Tanaka et al. | |
| 2012/0320927 A1 | 12/2012 | Katou et al. | |
| 2013/0031212 A1 | 1/2013 | Enosaki et al. | |
| 2013/0081106 A1 | 3/2013 | Harata et al. | |
| 2013/0173112 A1 | 7/2013 | Takahashi et al. | |
| 2013/0219170 A1 | 8/2013 | Naitou et al. | |
| 2014/0277925 A1 | 9/2014 | Tanaka et al. | |
| 2014/0317729 A1 | 10/2014 | Naitou et al. | |
| 2015/0057840 A1 | 2/2015 | Katou et al. | |
| 2015/0254909 A1 | 9/2015 | Harata et al. | |
| 2015/0281022 A1 | 10/2015 | Harata et al. | |
| 2015/0301822 A1 | 10/2015 | Takahashi et al. | |
| 2016/0318522 A1 | 11/2016 | Tanaka et al. | |
| 2017/0090907 A1 | 3/2017 | Kurosawa et al. | |
| 2018/0095745 A1* | 4/2018 | Mine | G06F 11/3664 |
| 2018/0203685 A1 | 7/2018 | Nakamura et al. | |
| 2019/0026097 A1* | 1/2019 | Jebbar | G06F 9/44505 |
| 2019/0026098 A1* | 1/2019 | Yamashita | H04W 4/80 |
| 2019/0108014 A1 | 4/2019 | Nakamura et al. | |
| 2019/0111907 A1 | 4/2019 | Harata et al. | |
| 2019/0155594 A1* | 5/2019 | Nakaguma | G06F 9/445 |
| 2019/0266017 A1 | 8/2019 | Nakamura et al. | |
| 2019/0287626 A1 | 9/2019 | Kawasaki et al. | |
| 2020/0216083 A1 | 7/2020 | Kawasaki et al. | |
| 2020/0401395 A1* | 12/2020 | Biermann | B60W 50/06 |
| 2021/0173634 A1* | 6/2021 | Nakahara | G06F 8/658 |

FOREIGN PATENT DOCUMENTS

| | | |
|---|---|---|
| JP | 5423736 B2 | 2/2014 |
| JP | 5423754 B2 | 2/2014 |
| JP | 5435022 B2 | 3/2014 |
| JP | 5454517 B2 | 3/2014 |
| JP | 2014088150 A | 5/2014 |
| JP | 5556824 B2 | 7/2014 |
| JP | 5601239 B2 | 10/2014 |
| JP | 2014201085 A | 10/2014 |
| JP | 5709055 B2 | 4/2015 |
| JP | 5783103 B2 | 9/2015 |
| JP | 5838898 B2 | 1/2016 |
| JP | 2016015020 A | 1/2016 |
| JP | 2016032274 A | 3/2016 |
| JP | 5900007 B2 | 4/2016 |
| JP | 5949416 B2 | 7/2016 |
| JP | 5949417 B2 | 7/2016 |
| JP | 2016224898 A | 12/2016 |
| JP | 6056424 B2 | 1/2017 |
| JP | 2017028523 A | 2/2017 |
| JP | 2017114156 A | 6/2017 |
| JP | 2017220091 A | 12/2017 |
| JP | 2017220092 A | 12/2017 |
| JP | 2018013837 A | 1/2018 |
| JP | 2018065410 A | 4/2018 |
| JP | 2018092577 A | 6/2018 |
| JP | 2018097571 A | 6/2018 |
| JP | 2018129093 A | 8/2018 |
| JP | 2019066181 A | 4/2019 |

* cited by examiner

FIG. 3

| DCM REWRITE SPECIFICATION DATA | | |
|---|---|---|
| | ITEM | VALUES (EXAMPLE) |
| SPECIFICATION DATA INFORMATION | ADDRESS INFORMATION | 0x10000000 |
| | FILE NAME | SPECIFICATION.bin |
| ECU (ID1) INFORMATION | ECU_ID | 1 |
| | UPDATE PROGRAM ACQUISITION ADDRESS | 0x10000000 |
| | UPDATE PROGRAM SIZE | 1Mbyte |
| | ROLLBACK PROGRAM ACQUISITION ADDRESS | 0x20000000 |
| | ROLLBACK PROGRAM SIZE | 1Mbyte |
| ECU (ID2) INFORMATION | ECU_ID | 2 |
| | UPDATE PROGRAM ACQUISITION ADDRESS | 0x30000000 |
| | UPDATE PROGRAM SIZE | 1Mbyte |
| | ROLLBACK PROGRAM ACQUISITION ADDRESS | 0x40000000 |
| | ROLLBACK PROGRAM SIZE | 1Mbyte |
| ECU (ID3) INFORMATION | ECU_ID | 3 |
| | UPDATE PROGRAM ACQUISITION ADDRESS | 0x50000000 |
| | UPDATE PROGRAM SIZE | 1Mbyte |
| | ROLLBACK PROGRAM ACQUISITION ADDRESS | 0x60000000 |
| | ROLLBACK PROGRAM SIZE | 1Mbyte |
| ECU (ID4) INFORMATION | ECU_ID | 4 |
| | UPDATE PROGRAM ACQUISITION ADDRESS | 0x70000000 |
| | UPDATE PROGRAM SIZE | 1Mbyte |
| | ROLLBACK PROGRAM ACQUISITION ADDRESS | 0x80000000 |
| | ROLLBACK PROGRAM SIZE | 1Mbyte |
| ECU (ID5) INFORMATION | ECU_ID | 5 |
| | UPDATE PROGRAM ACQUISITION ADDRESS | 0x90000000 |
| | UPDATE PROGRAM SIZE | 1Mbyte |
| | ROLLBACK PROGRAM ACQUISITION ADDRESS | 0xA0000000 |
| | ROLLBACK PROGRAM SIZE | 1Mbyte |
| ECU (ID6) INFORMATION | ECU_ID | 6 |
| | UPDATE PROGRAM ACQUISITION ADDRESS | 0xB0000000 |
| | UPDATE PROGRAM SIZE | 1Mbyte |
| | ROLLBACK PROGRAM ACQUISITION ADDRESS | 0xC0000000 |
| | ROLLBACK PROGRAM SIZE | 1Mbyte |

FIG. 4

| CGW REWRITE SPECIFICATION DATA | | |
|---|---|---|
| ITEM | | VALUES (EXAMPLE) |
| GROUP INFORMATION | FIRST GROUP INFORMATION | ECU(ID1)→ECU(ID2)→ECU(ID3) |
| | SECOND GROUP INFORMATION | ECU(ID4)→ECU(ID5)→ECU(ID6) |
| BUS LOAD TABLE | | |
| BATTERY LOAD | | 40% |
| VEHICLE CONDITION DURING REWRITING | | ENTIRELY PARKED/ENTIRELY TRAVELING/OPTIMAL |
| SCENE INFORMATION | | RECALL/DEALER/FACTORY/FUNCTION UPDATE NOTIFICATION/FORCED |
| ECU(IDn) INFORMATION n=1~6 | ECU ID | 1 |
| | CONNECTION BUS | FIRST BUS |
| | CONNECTION POWER SUPPLY | +B POWER, ACC POWER, IG POWER |
| | SECURITY ACCESS KEY INFORMATION | RANDOM NUMBER VALUE |
| | | KEY PATTERN |
| | | DECRYPTION OPERATION PATTERN |
| | MEMORY TYPE | SINGLE-BANK MEMORY/PSEUDO-DOUBLE-BANK MEMORY/DOUBLE-BANK MEMORY |
| | REWRITE METHOD | SELF-RETENTION POWER/POWER SUPPLY CONTROL |
| | SELF-RETENTION POWER TIME | 5 MINUTES |
| | REWRITE BANK INFORMATION | BANK-A IS START BANK AND BANK-B IS REWRITE BANK |
| | UPDATE PROGRAM VERSION | 2.0 |
| | UPDATE PROGRAM ACQUISITION ADDRESS | 0x10000000 |
| | UPDATE PROGRAM SIZE | 1Mbyte |
| | ROLLBACK PROGRAM VERSION | 1.0 |
| | ROLLBACK PROGRAM ACQUISITION ADDRESS | 0x20000000 |
| | ROLLBACK PROGRAM SIZE | 1Mbyte |
| | UPDATE PROGRAM DATA TYPE | DIFFERENCE DATA/ENTIRE DATA |
| | ROLLBACK PROGRAM DATA TYPE | DIFFERENCE DATA/ENTIRE DATA |

FIG. 6

| ECU SW ID | ECU PROGRAM (OLD) | ECU PROGRAM (NEW) | INTEGRITY VERIFICATION DATA OF ECU PROGRAM (OLD) | INTEGRITY VERIFICATION DATA OF ECU PROGRAM (NEW) | UPDATE DATA (DIFFERENCE DATA) | INTEGRITY VERIFICATION DATA OF UPDATE DATA | ROLLBACK DATA (DIFFERENCE DATA) | INTEGRITY VERIFICATION DATA OF ROLLBACK DATA (DIFFERENCE DATA) |
|---|---|---|---|---|---|---|---|---|
| ads_002 | adsfile001 | adsfile002 | w1 | z1 | adsfile001~002 | x1 | adsfile002~001 | y1 |
| brk_005 | brkfile001 | brkfile005 | w2 | z2 | brkfile001~005 | x2 | brkfile005~001 | y2 |
| eps_011 | epsfile010 | epsfile011 | w3 | z3 | epsfile010~011 | x3 | epsfile011~010 | y3 |

32 ECU REPROGRAMMING DATA DB

| VIN | VEHICLE TYPE | Vehicle SW ID | Digest | Sys ID | ECU ID | ECU SW ID | ACTIVE BANK | ACCESS LOG | REPROGRAMMING STATUS |
|---|---|---|---|---|---|---|---|---|---|
| 1 | aaa | 0001 | xxxxxx | SA01_01 | ADS | aaa_ads_001 | — | 2018/12/10 07:05 | NO |
|   |     |      |        | SA02_01 | ENG | aaa_eng_010 | BANK-A | | |
|   |     |      |        | SA02_01 | BRK | aaa_brk_001 | BANK-A | | |
|   |     |      |        | SA02_01 | EPS | aaa_eps_010 | BANK-A | | |
| 2 | aaa | 0002 | yyyyyy | SA01 | ADS | bbb_ads_002 | — | 2018/12/30 12:10 | ACTIVATION COMPLETED |
| 3 | bbb | 1001 | zzzzzz | SA01 | ADS | bbb_ads_001 | — | 2018/11/04 08:23 | DOWNLOAD COMPLETED |

41 INDIVIDUAL VEHICLE INFORMATION DB

| CAMPAIGN ID | PACKAGE ID | CAMPAIGN DETAILS | TARGET VIN LIST | Vehicle SW ID BEFORE UPDATE | Vehicle SW ID AFTER UPDATE | ECU SW ID LIST BEFORE UPDATE | ECU SW ID LIST AFTER UPDATE |
|---|---|---|---|---|---|---|---|
| cpn_001 | pkg_001 | TEXT STATEMENT | ... | 0001 | 0002 | ads_001,brk_001, eps_010 | ads_002,brk_005, eps_011 |
| cpn_002 | pkg_002 | TEXT STATEMENT | ... | 1001 | 1002 | ... | ... |

45 CAMPAIGN DB

FIG. 14

| CATEGORY | TYPE | DATA EXAMPLE |
|---|---|---|
| FIRST CATEGORY | DATA TO BE ERASED UNCONDITIONALLY | PERSONAL INFORMATION (NAME, ADDRESS, TELEPHONE NUMBER, EMAIL ADDRESS, CREDIT CARD ID, MAP APPLICATION INCLUDING VICINITY OF USER'S HOME, ...) CONTENT NOT INCLUDING IMPORTANT FUNCTIONS |
| SECOND CATEGORY | DATA THAT USER CAN SELECT TO ERASE OR ROLL BACK | PAID CONTENT, CUSTOMIZED CONTENT, ... |
| THIRD CATEGORY | DATA TO BE ROLLED BACK UNCONDITIONALLY | RECALL CONTENT, FREE CONTENT, CONTENT INCLUDING IMPORTANT FUNCTIONS, ... |

| VIN | CAMPAIGN ID | CAMPAIGN TYPE | BILLING |
|---|---|---|---|
| 1 | cpn_001 | RECALL SERVICE | NO |
| 1 | cpn_002 | FUNCTIONAL IMPROVEMENT | YES |
| 1 | cpn_003 | FUNCTIONAL IMPROVEMENT | NO |

56 INDIVIDUAL VEHICLE CAMPAIGN HISTORY DB

FIG. 17

| INITIALIZATION CAMPAIGN ID | INITIALIZATION PACKAGE ID | INITIALIZATION CAMPAIGN DETAILS | TARGET VIN LIST | Vehicle SW ID BEFORE INITIALIZATION | Vehicle SW ID AFTER INITIALIZATION | ECU SW ID LIST BEFORE INITIALIZATION | ECU SW ID LIST AFTER INITIALIZATION |
|---|---|---|---|---|---|---|---|
| INITIALIZATION cpn_001 | INITIALIZATION pkg_001 | TEXT STATEMENT | ... | 0003 | 0002 | ads_003,eng_020, brk_005,eps_012 | ads_002,eng_010, brk_005,eps_011 |
| INITIALIZATION cpn_002 | INITIALIZATION pkg_002 | TEXT STATEMENT | ... | 1002 | 1001 | ... | ... |

57 INITIALIZATION CAMPAIGN DB

VEHICLE ELECTRONIC CONTROL SYSTEM, DATA INITIALIZATION METHOD, CENTER DEVICE, VEHICLE MASTER DEVICE, STORAGE MEDIUM FOR STORING INITIALIZATION PACKAGE DISTRIBUTION PROGRAM, AND STORAGE MEDIUM STORING DATA INITIALIZATION PROGRAM

CROSS REFERENCE TO RELATED APPLICATIONS

This application is a continuation application of International Patent Application No. PCT/JP2021/012597 filed on Mar. 25, 2021, which designated the U.S. and claims the benefit of priority from Japanese Patent Application No. 2020-075394 filed on Apr. 21, 2020. The entire disclosure of all of the above application is incorporated herein by reference.

TECHNICAL FIELD

The present disclosure relates to a vehicle electronic control system, a data initialization method, a center device, a vehicle master device, a non-transitory computer-readable storage medium storing an initialization package distribution program, and a non-transitory computer-readable storage medium storing a data initialization program.

BACKGROUND

In recent years, the scale of software for vehicle control, diagnosis, and the like, installed in an electronic control unit (hereinafter, referred to as an ECU) of a vehicle, has been increased due to the diversification of vehicle control such as a driver-assistance function and an autonomous driving function. There have been more opportunities to rewrite software of an ECU in response to upgrading for functional improvement or the like. On the other hand, a technique for connected cars has also been spread with the progress of communication networks or the like. Under these circumstances, a technique has been proposed in which a vehicle master device as a relay device is provided on a vehicle side, and update data downloaded wirelessly from a center device by the vehicle master device is distributed to a rewrite target ECU, and thus software of the rewrite target ECU is rewritten through Over The Air (OTA).

SUMMARY

According to one aspect of the present disclosure, a center device distributes campaign information and a package including update data related to program update.

A vehicle master device controls program update of a rewrite target electronic control unit (ECU) based on the campaign information and the package received from the center device.

At the center device, an initialization request receiving unit receives an initialization request for data stored on a vehicle side. An initialization target specifying unit is configured to specify initialization target data when the data initialization request is received by the initialization request receiving unit. An initialization campaign information distribution unit is configured to distribute initialization campaign information corresponding to an initialization package for initializing the initialization target data. An initialization package distribution unit is configured to distribute the initialization package.

At the vehicle master device, an initialization campaign information receiving unit that is configured to receive the initialization campaign information from the center device.

An initialization package receiving unit is configured to receive the initialization package from the center device. An initialization execution unit is configured to initialize the initialization target data based on the initialization campaign information and the initialization package.

BRIEF DESCRIPTION OF DRAWINGS

The features and advantages of the present disclosure will become more apparent from the following detailed description with reference to the accompanying drawings. In the drawings:

FIG. 3 is a diagram illustrating DCM rewrite specification data;
FIG. 4 is a diagram illustrating CGW rewrite specification data;
FIG. 6 is a diagram illustrating an ECU reprogramming data DB;
FIG. 14 is a diagram illustrating classification of initialization target data;
FIG. 17 is a diagram illustrating an initialization campaign DB.

DESCRIPTION OF EMBODIMENTS

Figure 1:
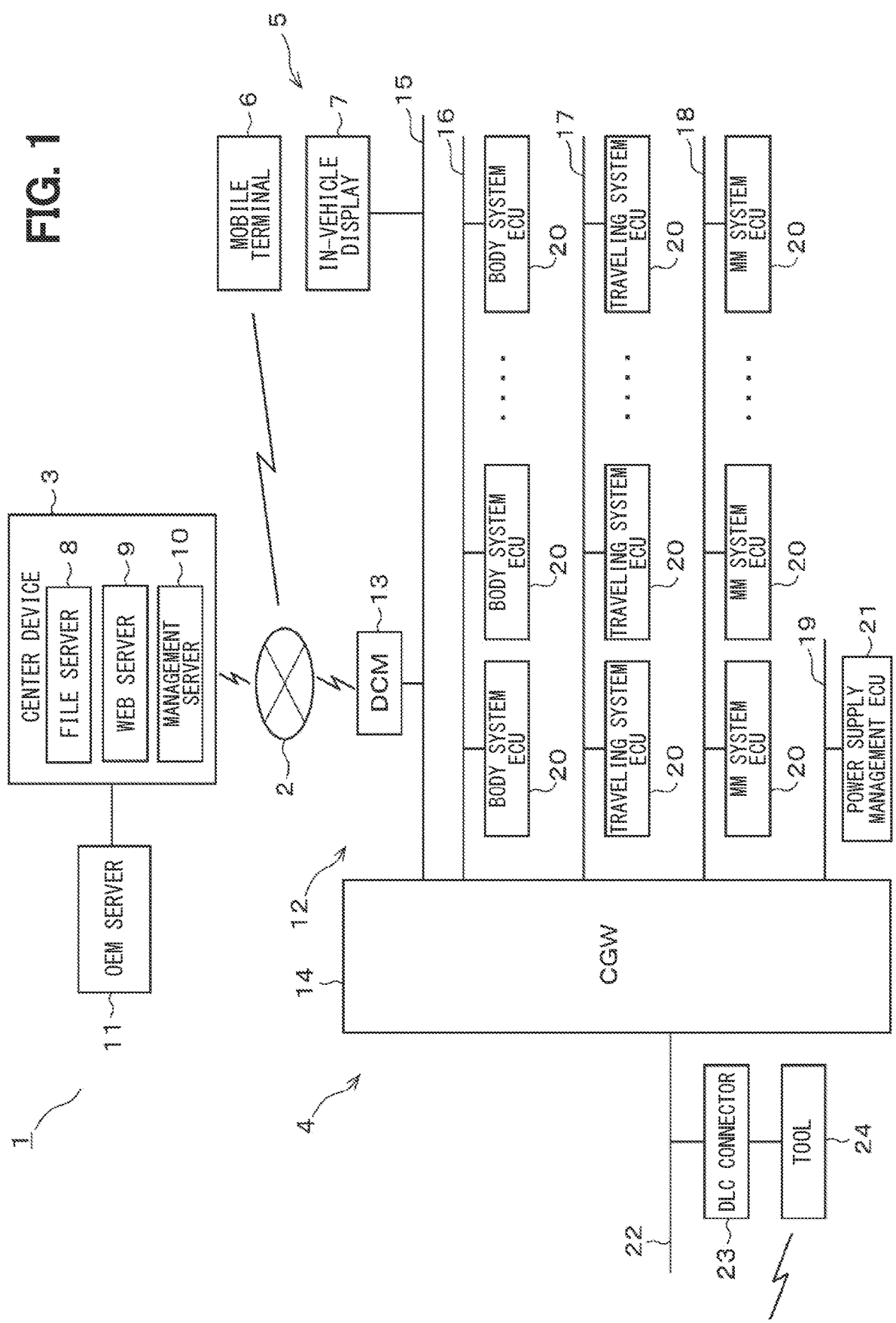
FIG. 1 is a diagram illustrating the overall configuration according to an embodiment.

To begin with, a relevant technology will described first only for understanding the following embodiments. In a configuration in which software of a rewrite target ECU is rewritten through OTA, it may occur that data of personal information is set on an in-vehicle operation terminal or data of software purchased for a fee is installed in the rewrite target ECU. Thus, when a vehicle is transferred from an old owner to a new owner, it is desirable that the data of personal information or the data of software purchased for a fee is initialized.

One objective of the present disclosure is to properly initialize data stored on a vehicle side.

As described above, according to one aspect of the present disclosure, a center device distributes campaign information and a package including update data related to program update. A vehicle master device controls program update of a rewrite target electronic control unit (ECU) based on the campaign information and the package received from the center device.

At the center device, an initialization request receiving unit receives an initialization request for data stored on a vehicle side. An initialization target specifying unit is configured to specify initialization target data when the data initialization request is received by the initialization request receiving unit. An initialization campaign information distribution unit is configured to distribute initialization campaign information corresponding to an initialization package for initializing the initialization target data. An initialization package distribution unit is configured to distribute the initialization package.

At the vehicle master device, an initialization campaign information receiving unit that is configured to receive the initialization campaign information from the center device.

An initialization package receiving unit is configured to receive the initialization package from the center device. An initialization execution unit is configured to initialize the initialization target data based on the initialization campaign information and the initialization package.

When a data initialization request is received in the center device, initialization target data is specified, the initialization campaign information and the initialization package are distributed, and when the initialization campaign information and the initialization package are received from the center device in the vehicle master device, the initialization target data is initialized based on the received initialization campaign information and initialization package. Initialization campaign information and initialization package similar to a package including campaign information and update data related to program update are defined, and the initialization campaign information and the initialization package are transmitted and received between the center device and the vehicle master device. Therefore, data stored on the vehicle side can be appropriately initialized.

According to a second aspect of the present disclosure, a data initialization method is for a vehicle electronic control system including: a center device that is configured to distribute campaign information and a package including update data related to program update; and a vehicle master device that is configured to control program update of a rewrite target electronic control device based on the campaign information and the package received from the center device. The method includes: receiving an initialization request for data stored on a vehicle side; specifying initialization target data when the data initialization request is received; distributing initialization campaign information corresponding to an initialization package for initializing the initialization target data; distributing the initialization package; receiving the initialization campaign information; receiving the initialization package; and initializing the initialization target data based on the initialization campaign information and the initialization package.

According to a third aspect of the present disclosure, a center device is configured to distribute campaign information and a package including update data related to program update. The center device includes: an initialization request receiving unit that is configured to receive an initialization request for data stored on a vehicle side; an initialization target specifying unit that is configured to specify initialization target data when the data initialization request is received by the initialization request receiving unit; an initialization campaign information distribution unit that is configured to distribute initialization campaign information corresponding to an initialization package for initializing the initialization target data; and an initialization package distribution unit that is configured to distribute the initialization package.

According to a fourth aspect of the present disclosure, a vehicle master device is configured to control program update of a rewrite target electronic control unit based on campaign information and a package received from a center device. The vehicle master device includes: an initialization campaign information receiving unit that is configured to receive initialization campaign information from the center device; an initialization package receiving unit that is configured to receive an initialization package from the center device; and an initialization execution unit that is configured to initialize initialization target data based on the initialization campaign information and the initialization package.

According to a fifth aspect of the present disclosure, a non-transitory computer-readable storage medium stores an initialization package distribution program for a center device that is configured to distribute campaign information and update data related to program update. The program causes the center device to: receive an initialization request for data stored on a vehicle side; specify initialization target data when the data initialization request is received; distribute initialization campaign information corresponding to an initialization package for initializing the initialization target data; and distribute the initialization package.

According to a sixth aspect of the present disclosure, a non-transitory computer-readable storage medium stores a data initialization program for a vehicle master device that is configured to control program update of a rewrite target electronic control unit based on campaign information and a package received from a center device. The program causes the vehicle master device to: receive initialization campaign information from the center device; receive an initialization package from the center device; and initialize initialization target data based on the initialization campaign information and the initialization package.

According to a seventh aspect of the present disclosure, a method is for a center device that is configured to distribute campaign information and a package including update data related to program update. The method includes: receiving an initialization request for data stored on a vehicle side; specifying initialization target data when the data initialization request is received; distributing initialization campaign information corresponding to an initialization package for initializing the initialization target data; and distributing the initialization package.

Hereinafter, one embodiment will be described with reference to the drawings. A vehicle program rewriting system (corresponding to a vehicle electronic control system) is a system in which application programs for vehicle control, diagnosis, and the like, installed in an electronic control unit (hereinafter, referred to as an ECU) can be rewritten through Over The Air (OTA). In the present embodiment, a case where an application program is rewritten in a wired or wireless manner will be described, but the present disclosure may be applied to a case where data used in various applications, such as map data used in a map application, and control parameters used in an ECU is rewritten in a wired or wireless manner.

The rewriting of an application program in a wired manner includes not only acquiring and rewriting the application program from the outside of a vehicle in a wired manner but also acquiring and rewriting various pieces of data used when the application program is executed from the outside of the vehicle in the wired manner. The rewriting of an application program in a wireless manner includes not only acquiring and rewriting the application program from the outside of a vehicle in the wireless manner but also acquiring and rewriting various pieces of data used when the application program is executed from the outside of the vehicle in the wireless manner.

As illustrated in FIG. 1, a vehicle program rewriting system 1 includes a center device 3 on a communication network 2 side, a vehicle-side system 4 on a vehicle side, and a display terminal 5. The communication network 2 is configured to include, for example, a mobile object communication network such as a 4G line, the Internet, and Wireless Fidelity (Wi-Fi (registered trademark)).

The display terminal 5 is a terminal having a function of receiving operation input from a user and a function of displaying various screens, and is, for example, a mobile terminal 6 such as a smartphone or a tablet computer that can be carried by a user, and an in-vehicle display 7 located in a vehicle compartment. The mobile terminal 6 can perform data communication with the center device 3 via the communication network 2 as long as the mobile terminal 6 is within a communication range of a mobile object communication network. The in-vehicle display 7 is connected to the vehicle-side system 4, and may also have a navigation function. The in-vehicle display 7 may be an in-vehicle display ECU having an ECU function, or may have a function of controlling display on a center display, a meter display, or the like.

As long as a user is located outside the vehicle compartment and is within a communication range of the mobile object communication network, the user can perform operation input while checking various screens related to rewriting of an application program with the mobile terminal 6, and can perform a procedure related to the rewriting of the application program. In the vehicle compartment, the user can perform operation input while checking various screens related to rewriting of the application program with the in-vehicle display 7, and can perform a procedure related to rewriting of the application program. That is, the user can use the mobile terminal 6 and the in-vehicle display 7 separately outside the vehicle compartment and in the vehicle compartment, and can perform a procedure related to rewriting of the application program.

The center device 3 controls a program update function of the communication network 2 side in the vehicle program rewriting system 1, and functions as an OTA center. The center device 3 has a file server 8, a web server 9, and a management server 10, and multiple servers 8 to 10 different for each function are configured to enable data communication with each other. The center device 3 is connected to an OEM server 11 managed by an OEM to be capable of performing data communication.

The file server 8 is a server that manages a file of an application program distributed from the center device 3 to the vehicle-side system 4. The file server 8 manages update data provided by a supplier or the like that is a provider of an application program distributed from the center device 3 to the vehicle-side system 4, distribution specification data provided by an original equipment manufacturer (OEM), and a vehicle condition acquired from the vehicle-side system 4, and the like. The file server 8 can perform data communication with the vehicle-side system 4 via the communication network 2, and when a package download request is generated, a package in which reprogramming data and distribution specification data are packaged in one file is transmitted to the vehicle-side system 4.

The web server 9 is a server that manages web information. The web server 9 transmits web data managed thereby in response to a request from a web browser of the mobile terminal 6 or the like. The management server 10 is a server that manages personal information of a user registered in a service of rewriting an application program, a rewrite history of an application program for each vehicle, and the like.

The vehicle-side system 4 has a master device 12 (corresponding to a vehicle master device). The master device 12 has a data communication module (DCM) 13 and a central gate way (CGW) 14. The DCM 13 and the CGW 14 are connected to each other via the first bus 15 to be capable of performing data communication. The DCM 13 performs data communication with the center device 3 via the communication network 2. When a package is downloaded from the file server 8, the DCM 13 extracts write data from the downloaded package and transfers the extracted write data to the CGW 14.

The CGW 14 has a data relay function, and when write data is acquired from the DCM 13, the CGW 14 instructs a rewrite target ECU, which is a rewrite target of the application program, to write the acquired write data, and distributes the write data to the rewrite target ECU. When writing of the write data is completed in the rewrite target ECU and rewriting of the application program is completed, the CGW 14 instructs the rewrite target ECU to validate the application program after the rewriting is completed.

The master device 12 controls the program update function on the vehicle side in the vehicle program rewriting system 1 and functions as an OTA master. Although FIG. 1 exemplifies a configuration in which the DCM 13 and the in-vehicle display 7 are connected to the same first bus 15, a configuration in which the DCM 13 and the in-vehicle display 7 are connected to different buses may be used. The CGW 14 may have some or all of the functions of the DCM 13, or the DCM 13 may have some or all of the functions of the CGW 14. That is, in the master device 12, the division of functions between the DCM 13 and the CGW 14 may be configured in any way. The master device 12 may be configured with two ECUs of the DCM 13 and the CGW 14, or may be configured with one integrated ECU having the functions of the DCM 13 and the functions of the CGW 14.

In addition to the first bus 15, a second bus 16, a third bus 17, a fourth bus 18, and a fifth bus 19 are connected to the CGW 14 as buses inside the vehicle. The CGW 14 is connected to various ECUs 20 via the buses 16 to 18, and is connected to a power supply management ECU 21 via the bus 19.

The second bus 16 is, for example, a body system network bus. The ECU 20 connected to the second bus 16 is an ECU that controls the body system. ECUs controlling the body system include, for example, a door ECU controlling locking/unlocking of a door, a meter ECU controlling display on the meter display, an air conditioner ECU controlling driving of an air conditioner, a window ECU controlling opening and closing of a window, and a security ECU driven to prevent theft of the vehicle.

The third bus 17 is, for example, a traveling system network bus. The ECU 20 connected to the third bus 17 is an ECU that controls the traveling system. ECUs controlling the traveling system include, for example, an engine ECU controlling driving of an engine, a brake ECU controlling driving of a brake, an electronic controlled transmission (ECT) ECU controlling driving of an automatic transmission, and a power steering ECU controlling driving of a power steering.

The fourth bus 18 is, for example, a multimedia system network bus. The ECU 20 connected to the fourth bus 18 is an ECU that controls the multimedia system. ECUs controlling the multimedia system include, for example, a navigation ECU controlling a navigation system, and an ETC ECU controlling an Electronic Toll Collection System (ETC, registered trademark). The buses 16 to 18 may be buses of a system other than the body system network bus, the traveling system network bus, and the multimedia system network bus. The number of buses or the number of ECUs 20 is not limited to the exemplified configuration.

The power supply management ECU 21 is an ECU that manages power to be supplied to the DCM 13, the CGW 14, various ECUs 20, and the like.

A sixth bus 22 is connected to the CGW 14 as a bus on the outside of the vehicle. A data link coupler (DLC) connector 23 to which a tool 24 is detachably connected is connected to the sixth bus 22. The buses 15 to 19 on the inside of the vehicle and the bus 22 on the outside of the vehicle are configured with, for example, Controller Area Network (CAN, registered trademark) buses, and the CGW 14 performs data communication with the DCM 13, various ECUs 20, and the tool 24 according to a CAN data communication standard or a diagnosis communication standard (Unified Diagnosis Services (UDS): ISO14229). The DCM 13 and the CGW 14 may be connected via an Ethernet, or the DLC connector 23 and the CGW 14 may be connected via an Ethernet.

When the rewrite target ECU 20 receives the write data from the CGW 14, the rewrite target ECU 20 writes the received write data in the flash memory and thus rewrites the application program. In the above configuration, when the CGW 14 receives a write data acquisition request from the rewrite target ECU 20, the CGW 14 functions as a reprogramming master that distributes the write data to the rewrite target ECU 20. When the rewrite target ECU 20 receives the write data from the CGW 14, the rewrite target ECU 20 writes the received write data in the flash memory and functions as a reprogramming slave for rewriting the application program.

As a mode of rewriting the application program, there are a wired rewrite mode and a wireless rewrite mode. The mode of rewriting the application program by wire is a mode of rewriting the rewrite target ECU 20 by using the application program acquired from the outside of the vehicle by wire. Specifically, when the tool 24 is connected to the DLC connector 23, the tool 24 transfers the write data to the CGW 14. The CGW 14 functions as a gateway, transmits a wired rewrite request to the rewrite target ECU 20, instructs the rewrite target ECU 20 to write the write data, and distributes the write data transferred from the tool 24 to the rewrite target ECU 20. Distributing the write data to the rewrite target ECU 20 is relaying the write data.

The mode of rewriting the application program wirelessly is a mode of rewriting the rewrite target ECU 20 by using the application program acquired wirelessly from the outside of the vehicle. Specifically, when the DCM 13 downloads a package from the file server 8, the DCM 13 extracts the write data from the downloaded package and transfers the write data to the CGW 14. The CGW 14 functions as a rewrite tool, instructs the rewrite target ECU 20 to write the write data, and distributes the write data transferred from the DCM 13 to the rewrite target ECU 20.

The mode of diagnosing the ECU 20 includes a wired diagnosis mode and a wireless diagnosis mode. The mode of diagnosing the ECU 20 by wire is a mode of diagnosing the diagnosis target ECU 20 from the outside of the vehicle by wire. Specifically, when the tool 24 is connected to the DLC connector 23, the tool 24 transfers a diagnosis request to the CGW 14. The CGW 14 functions as a gateway, transmits the diagnosis request to the diagnosis target ECU 20, and distributes a diagnosis command transferred from the tool 24 to the diagnosis target ECU 20. The diagnosis target ECU 20 performs a diagnosis process according to the diagnosis command received from the CGW 14.

The mode of wirelessly diagnosing the ECU 20 is a mode of wirelessly diagnosing the diagnosis target ECU 20 from the outside of the vehicle. Specifically, when a diagnosis command is transmitted from the center device 3 to the DCM 13 as a diagnosis request, the DCM 13 transfers a diagnosis command to the CGW 14. The CGW 14 functions as a gateway and distributes the diagnosis command to the diagnosis target ECU 20 as a diagnosis request. The diagnosis target ECU 20 performs a diagnosis process according to the diagnosis command received from the CGW 14.

Figure 2:
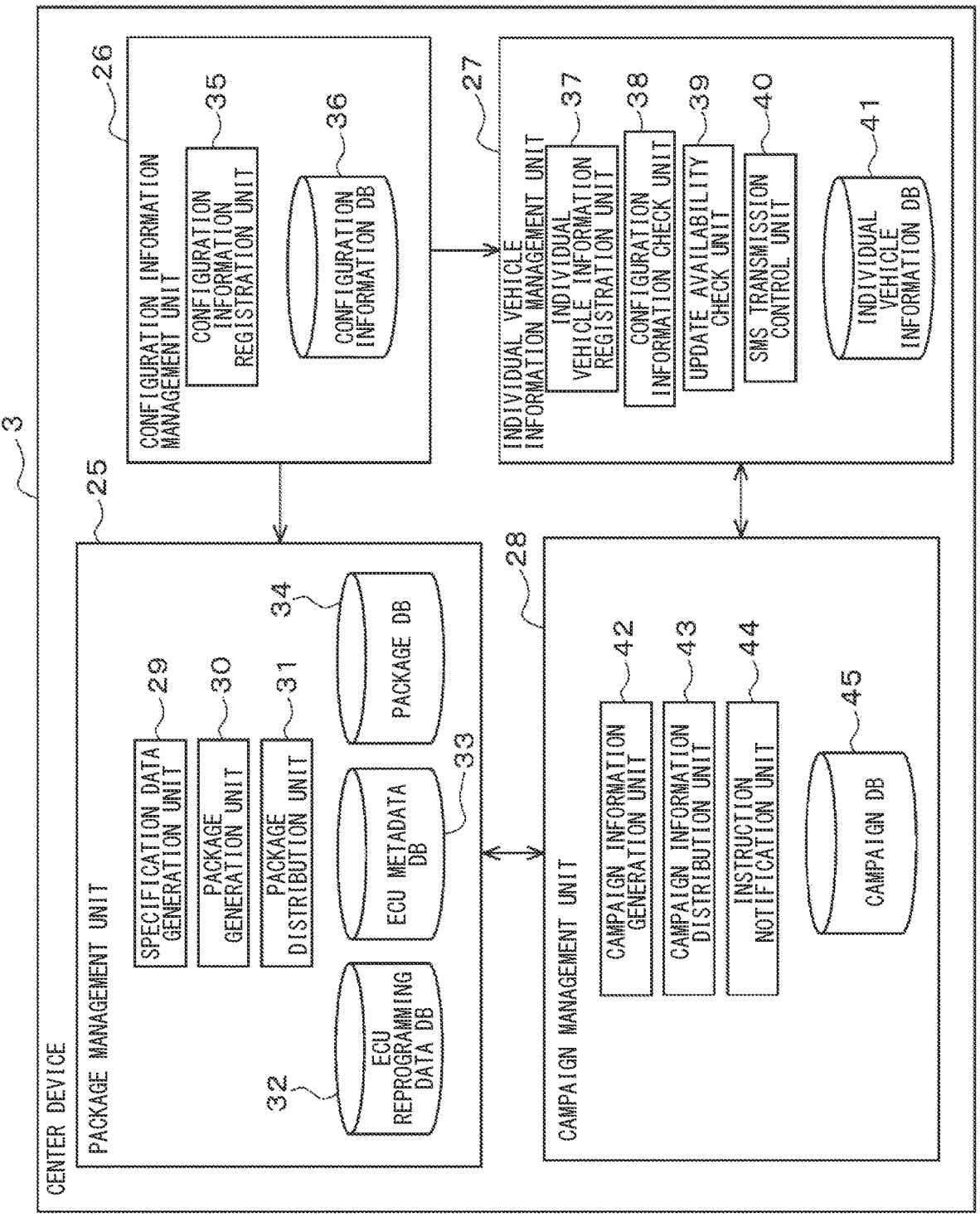
FIG. 2 is a functional block diagram of a center device.

A configuration of the center device 3 will be described. As illustrated in FIG. 2, the center device 3 includes a package management unit 25, a configuration information management unit 26, an individual vehicle information management unit 27, and a campaign information management unit 28 as functional blocks of portions related to respective functions of the servers 8 to 10 described above.

The package management unit 25 includes a specification data generation unit 29, a package generation unit 30, a package distribution unit 31, an ECU reprogramming data database (DB) 32, an ECU metadata DB 33, and a package DB 34. The specification data generation unit 29 refers to each DB and generates rewrite specification data. The rewrite specification data is data that defines operations involved in program update in the DCM 13, the CGW 14, the rewrite target ECU 20, and the like, and information related to program update includes information for specifying the rewrite target ECU 20, and information for specifying a rewrite order when there are multiple rewrite target ECUs 20, information for specifying a rollback method, and the like. The rewrite specification data is divided into DCM rewrite specification data used by the DCM 13 and CGW rewrite specification data used by the CGW 14. The DCM 13 updates a program according to the DCM rewrite specification data, and the CGW 14 updates a program according to the CGW rewrite specification data.

As illustrated in FIG. 3, the DCM rewrite specification data includes specification data information, ECU information, and the like. The specification data information includes address information and a file name. The ECU information includes address information and the like referred to when transmitting an update program (write data) of each rewrite target ECU 20 to the CGW 14 by the number of rewrite target ECUs 20. Specifically, the ECU information includes at least an ECU_ID indicating an ID for identifying an ECU, an update program acquisition address indicating a reference address when the update program is acquired, an update program size, and a rollback program acquisition address indicating a reference address when a rollback program is acquired, and a rollback program size. The rollback program is a program for returning the application program to an original version when the rewriting of the application program is canceled in the middle.

As illustrated in FIG. 4, the CGW rewrite specification data includes group information, a bus load table, a battery load, a vehicle condition during rewriting, scene information, ECU information, and the like. In addition to these, the CGW rewrite specification data may include rewrite procedure information and the like. The group information is information indicating a group to which the rewrite target ECU 20 belongs and a rewrite order. The bus load table is a table indicating a correspondence relationship between a power supply state and an allowable transmission amount for a bus, and is defined for each bus. The battery load is information indicating a lower limit value of a remaining battery charge of a vehicle battery allowable in the vehicle. The vehicle condition during rewriting is information indicating a vehicle condition in which rewriting is performed. The scene information is information indicating how to display approval or the like according to a situation.

The ECU information is information regarding the rewrite target ECU 20, and includes at least an ECU_ID for identifying a device, a connection bus for identifying a bus, a connection power supply, security access key information, a memory type, a rewrite method, a self-retention power time, rewrite bank information, an update program version, an update program acquisition address, an update program size, a rollback program version, a rollback program acquisition address, a rollback program size, an update program data type, and a rollback program data type. The values illustrated in FIGS. 3 and 4 are examples.

The package generation unit 30 generates a package including rewrite specification data and reprogramming data, and registers the generated package in the package DB 34. The package generation unit 30 may generate a package including distribution specification data. The package distribution unit 31 distributes the package registered in the package DB 34 to the vehicle-side system 4.

The configuration information management unit 26 has a configuration information registration unit 35 and a configuration information DB 36. The configuration information registration unit 35 registers approved configuration information for each vehicle type in the configuration information DB 36. The approved configuration information is configuration information of a vehicle approved by a public organization. The configuration information is identification information regarding hardware and software of the ECU 20 mounted on the vehicle. The configuration information also includes identification information of a system configuration including multiple ECUs 20 and identification information of a vehicle configuration including multiple systems. As the configuration information, vehicle restriction information related to program update may be registered. For example, the group information of the ECU 20, the bus load table, the information related to the battery load, and the like described in the rewrite specification data may be registered.

The individual vehicle information management unit 27 has an individual vehicle information registration unit 37, a configuration information check unit 38, an update availability check unit 39, a short message service (SMS) transmission control unit 40, and an individual vehicle information DB 41. The individual vehicle information registration unit 37 registers individual vehicle information uploaded from each vehicle in the individual vehicle information DB 41. The individual vehicle information registration unit 37 may register individual vehicle information at the time of production or sale of the vehicle in the individual vehicle information DB 41 as an initial value. When registering the uploaded individual vehicle information, the configuration information check unit 38 collates the individual vehicle information with the configuration information of the vehicle of the same type registered in the configuration information DB 36. The update availability check unit 39 checks availability of new program update for the individual vehicle information, and checks availability of campaign information. When the individual vehicle information is updated, the SMS transmission control unit 40 transmits a message regarding the update to the corresponding vehicle system 4 by SMS.

The campaign information management unit 28 has a campaign information generation unit 42, a campaign information distribution unit 43, an instruction notification unit 44, and a campaign DB 45. The campaign information generation unit 42 generates campaign information related to program update, and registers the generated campaign information in the campaign DB 45. The campaign information includes details of explanation to a user regarding program update, an ID of a package file to be downloaded, program update conditions, and the like. The campaign information is created by this information being defined by a predetermined data structure. The campaign information distribution unit 43 distributes the campaign information registered in the campaign DB 45 to the vehicle-side system 4. The instruction notification unit 44 notifies the vehicle-side system 4 of necessary instructions related to the program update. Portions other than the respective DBs of the management units 25 to 28 described above are functions realized by hardware and software of the computer.

Figure 5:
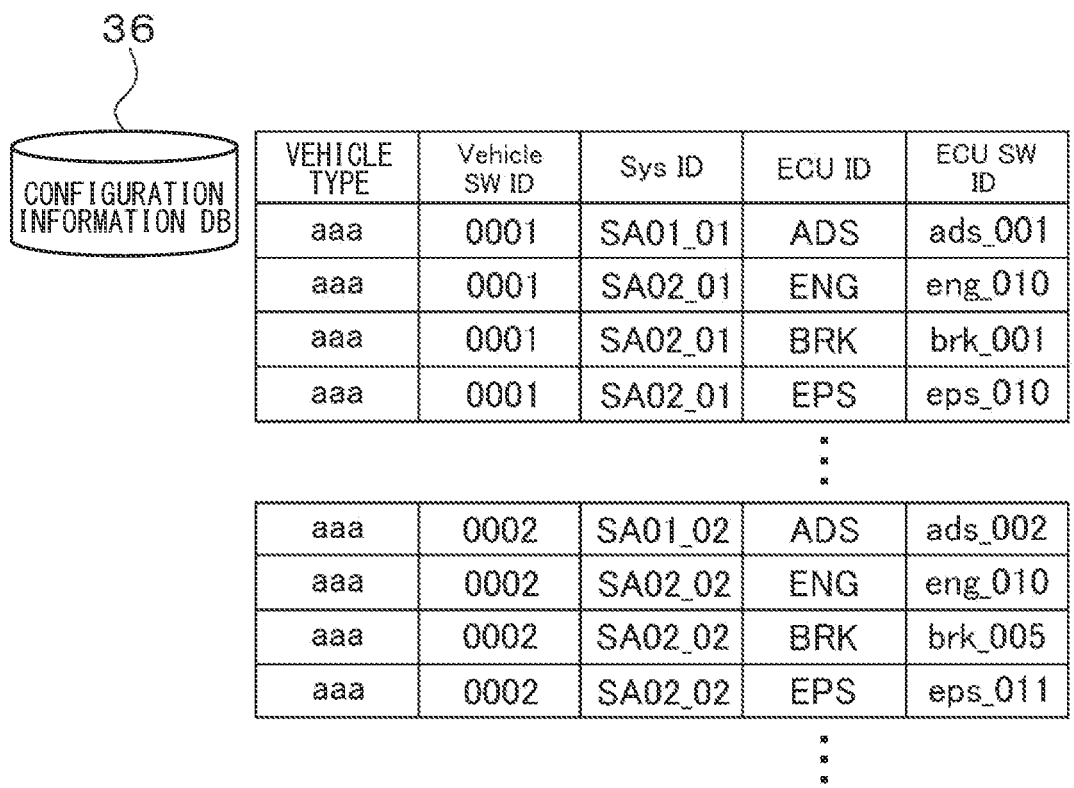
FIG. 5 is a diagram illustrating a configuration information DB.

Next, details of data registered in each DB will be described. As illustrated in FIG. 5, the following data is registered in the configuration information DB 36 as an example. The "vehicle type" indicates a vehicle model. The "Vehicle SW ID" is a software ID for the entire vehicle, and is given to each vehicle only once, and is updated as a version of an application program of at least any one ECU is updated. The "Sys ID" is an ID of a system, assuming that a group of a multiple ECUs 20 mounted on each vehicle is the "system", and is updated as a version of an application program of at least any one ECU forming the system is updated.

The "ECU ID" is a device identification ID indicating the type of each ECU 20. The "ECU SW ID" is a software ID for each ECU 20, and is updated as a version of an application program of the ECU 20 is updated. Even if the same "ECU ID" and the same program version are used, when hardware configurations are different, a different "ECU SW ID" is used. That is, the "ECU SW ID" is also information indicating a part number of the ECU 20.

FIG. 5 illustrates configuration information regarding a vehicle of "vehicle type"="aaa". Among the ECUs 20 mounted on the vehicle, an autonomous driving ECU (ADS), an engine ECU (ENG), a brake ECU (BRK), and an electric power steering ECU (EPS) are exemplified. For example, the "ECU SW ID" of "Vehicle SW ID"="0001" is "ads_001", "eng_010", "brk_001", "eps_010", whereas the "ECU SW ID" of the "Vehicle SW ID"="0002" is "ads_002", "eng_010", "brk_005", and "eps_011", and three software versions have been updated. Along with this, "Sys ID"="SA01_01" is updated to "SA01_02", and "Sys ID"="SA02_01" is updated to "SA02_02". As described above, the initial values are registered in the configuration information DB 36 at the time of production or sale of the vehicle, and is subsequently updated as a version of an application program of at least any one ECU is updated. That is, the configuration information DB 36 includes configuration information that normally exists in the market for each vehicle type.

As illustrated in FIG. 6, the following programs and data are registered in the ECU reprogramming data DB 32 as an example. In FIG. 6, among the ECUs 20 mounted on a certain vehicle type, the autonomous driving ECU (ADS), the brake ECU (BRK), and the electric power steering ECU (EPS) are exemplified as the ECUs 20 of which application programs are updated. Regarding the latest "ECU SW ID" of the update target ECU 20, an old program of the ECU 20, a new program of the ECU 20, integrity verification data of the old program, integrity verification data of the new program, update data that is difference data between the new program and the old program, integrity verification data of update data, rollback data that is also difference data, integrity verification data of rollback data, and the like are registered. The integrity verification data is a hash value obtained by applying a hash function to a data value. When the entire data of the new program is used as the update data instead of the difference data, the integrity verification data of the update data is same as the entire data of the new program. In FIG. 6, the data structure for the latest "ECU SW ID" is illustrated, but if data for the past "ECU SW ID" is stored, a new program with the previous "ECU SW ID" may be referred to for an old program. Each piece of the integrity verification data may have a format in which a value calculated by a supplier is registered, or may have a format in which a value calculated by the center device 3 is registered.

Figure 7:
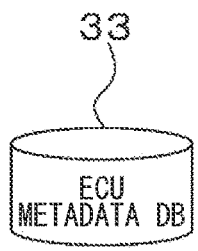
FIG. 7 is a diagram illustrating an ECU metadata DB.

As illustrated in FIG. 7, the following ECU individual specification data is registered in the ECU metadata DB 33 as an example. Regarding the latest "ECU SW ID", when a size of the update data file, a size of the rollback data file, and a flash memory provided in the ECU 20 have two or more banks, the ECU individual specification data are bank information indicating a program for any bank such as a bank-A, a bank-B, or a bank-C, a transfer size, a program file reading address, and the like.

Attribute information indicating attributes of the ECU 20 is also registered in the ECU metadata DB 33. The attribute information is information indicating hardware attributes and software attributes related to the ECU 20. Regarding the "vehicle type" and the "ECU ID", ECU individual specification data is a memory configuration of the flash memory included in the ECU 20, the type of bus to which the ECU 20 is connected, the type of power supply connected to the ECU 20, a key used by the CGW 14 when securely accessing the ECU 20, and the like.

As the memory configuration, a "single-bank" is a single-bank memory having a single flash bank, a "double-bank" is a double-bank memory having double flash banks, and "suspend" is a single-bank suspend memory having a pseudo-double flash banks. The hardware attribute information and the software attribute information are information used for rewrite control of each ECU 20 in the vehicle-side system 4. The hardware attribute information may be stored in advance by the CGW 14, but in the present embodiment, the hardware attribute information is managed by the center device 3 in order to reduce the management load on the vehicle-side system 4. The software attribute information is data that directly designates a rewrite operation of each ECU 20. The software attribute information is managed by the center device 3 such that flexible control in the vehicle-side system 4 can be realized.

Figure 8:
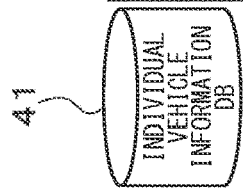
FIG. 8 is a diagram illustrating an individual vehicle information DB.

As illustrated in FIG. 8, in the individual vehicle information DB 41, the following data for each individual vehicle is registered as an example. Configuration information for each individual vehicle and status information of an individual vehicle for program update are mainly registered. Specifically, regarding the "VIN" that is an ID of each vehicle, the configuration information is a "Vehicle SW ID", a "Sys ID", an "ECU ID", an "ECU SW ID", and the like. A "Digest" value, which is a hash value for the configuration information, is also calculated and stored in the center device 3. An "active bank" is a bank in which a program currently operated by the ECU 20 is written when the memory configuration has a double-bank, and an uploaded value is registered together with the configuration information.

An "access log" is the date and time when the vehicle uploaded the individual vehicle information to the center device 3. A "reprogramming status" indicates a status of reprogramming in the vehicle, and includes, for example, "campaign information issued", "activation completed", "download completed", and the like. In other words, from this progress status, it can be seen which phase the reprogramming in the vehicle has progressed to and in which phase the reprogramming has stagnated. When the configuration information or the like is uploaded from the vehicle-side system 4 to the center device 3, a "VIN" of each vehicle is added to the information or the like.

Figure 9:
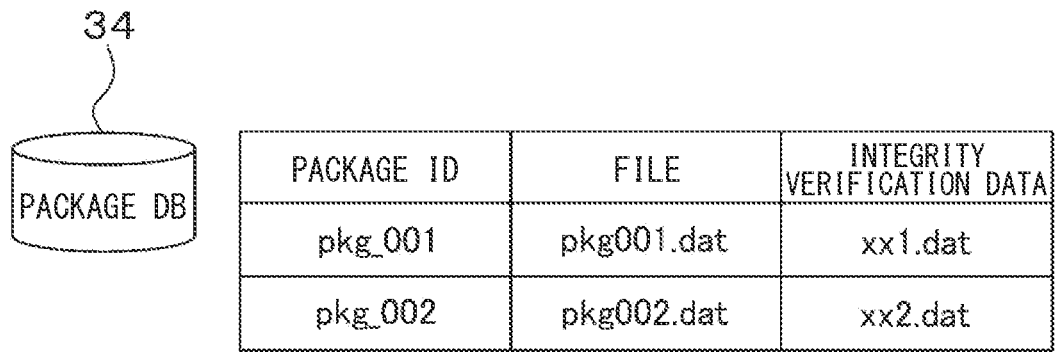
FIG. 9 is a diagram illustrating a package DB.
Figure 10:
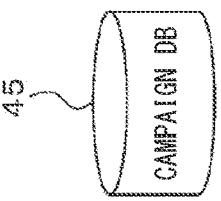
FIG. 10 is a diagram illustrating a campaign DB.

As illustrated in FIG. 9, a package ID, a package file, and integrity verification data of the package are registered in the package DB 34. As illustrated in FIG. 10, an ID of campaign information, an ID of a package, message information such as a text statement indicating the specific update details as details of the campaign information, a list of "VINs" that are IDs of vehicles as targets of the campaign information, "Vehicle SW IDs" before and after update, a list of "ECU SW IDs" before and after the update, and the like are registered in the campaign DB 45. The target VIN list may be registered by collating the individual vehicle information DB 41 with the campaign DB 45. The campaign information may be registered together with the package DB 34.

Figure 11:
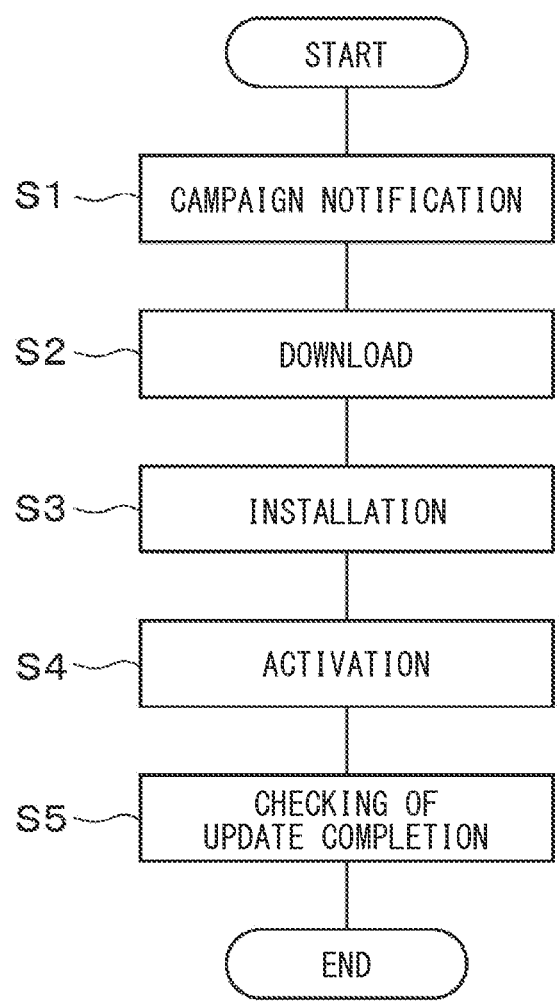
FIG. 11 is a diagram illustrating each phase in program update.

In the configuration in which the application program of the rewrite target ECU 20 is rewritten through OTA, the center device 3 distributes campaign information and a package to the vehicle side, and updates a program by advancing the phase step by step. Specifically, as illustrated in FIG. 11, a campaign notification phase (S1), a download phase (S2), an installation phase (S3), an activation phase (S4), and an update completion checking phase (S5) are sequentially performed. In the campaign notification phase, the center device 3 distributes the campaign information to the vehicle-side system 4. In the download phase, the master device 12 downloads the package including the write data from the center device 3. In the installation phase, the CGW 14 instructs the rewrite target ECU 20 to write the write data. In the activation phase, the rewrite target ECU 20 validates the write data. In the update completion checking phase, a notification of completion of the program update is provided. In this case, when a user updates the program, the user's approval is required in the download, installation, and activation phases. Hereinafter, a flow of processes when the user updates the program will be described.

Figure 12:
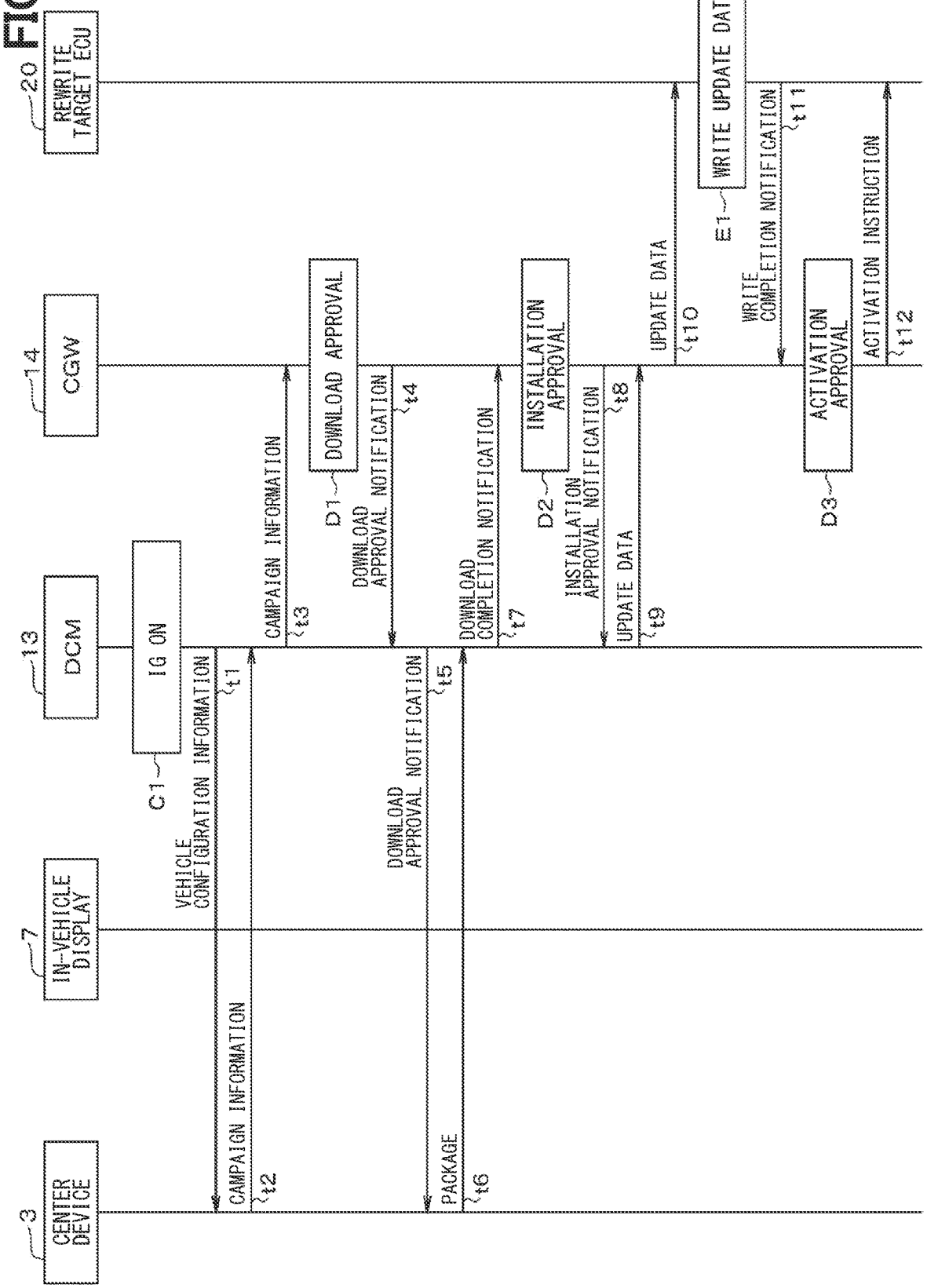
FIG. 12 is a diagram illustrating a flow of a program update process.

As illustrated in FIG. 12, when the DCM 13 determines that an ignition switch is turned on (C1), the DCM 13 transmits vehicle configuration information to the center device 3 (t1). When the center device 3 receives the vehicle configuration information from the DCM 13, the received vehicle configuration information is collated with the individual vehicle information DB 41 and the campaign DB 45, and the software information on the vehicle side and the latest software information managed by the center device 3 are collated such that it is determined whether there is campaign information to be distributed. When it is determined that the software information on the vehicle side is not the latest software information managed by the center device 3, the center device 3 determines that there is campaign information to be distributed, and distributes the campaign information to the DCM 13 (t2).

When the DCM 13 receives the campaign information from the center device 3, the DCM 13 transfers the received campaign information to the CGW 14 (t3). When the campaign information is transferred from the DCM 13, the CGW 14 displays a campaign notification screen on the in-vehicle display 7 and asks the user to approve or reject download of the package. The user can select whether to approve or reject the download of the package on the campaign notification screen. When the user selects the download approval (D1), the CGW 14 distributes a download approval notification to the DCM 13 (t4). Upon receiving the download approval notification from the CGW 14, the DCM 13 transmits the received download approval notification to the center device 3 (t5).

Upon receiving the download approval notification from the DCM 13, the center device 3 distributes a package in which the update data is packaged to the DCM 13 (t6). When the DCM 13 completes the download of the package from the center device 3, the DCM 13 transmits a download completion notification to the CGW 14 (t7). Upon receiving the download completion notification from the DCM 13, the CGW 14 displays a download completion screen on the in-vehicle display 7 and asks the user to approve or reject installation of the update data. The user can select whether to approve or reject the installation of the update data on the download completion screen. When the user selects the installation approval (D2), the CGW 14 distributes an installation approval notification to the DCM 13 (t8). Upon receiving the installation approval notification from the CGW 14, the DCM 13 transfers unpacked update data from the package to the CGW 14 (t9). When the update data is transferred from the DCM 13, the CGW 14 instructs the rewrite target ECU 20 to write the update data and also transfers the update data to the rewrite target ECU 20 (t10).

When the instruction for writing the update data from the CGW 14 and the update data is transferred, the rewrite target ECU 20 writes the update data into a non-volatile memory (E1) and when the writing of the update data into the non-volatile memory is completed, transmits a write completion notification to the CGW 14 (t11). Upon receiving the write completion notification from the rewrite target ECU 20, the CGW 14 displays an installation completion screen on the in-vehicle display 7 and asks the user to approve or reject activation. The user can select whether to approve or reject the activation on the installation completion screen. When the user selects the approval for activation (D3), the CGW 14 transmits an activation instruction to the rewrite target ECU 20 (t12) to perform the activation.

When a vehicle is bought, sold, or transferred, it is desirable that personal information data registered by an owner of the vehicle or software data downloaded from the center device is initialized. For example, if the personal information data is not initialized and an old owner's personal information data remains, the old owner's personal information data and a new owner's personal information data may be mixed and thus influence update of the software. If the software data is not initialized and software data purchased by the old owner for a fee remains, software functions will be taken over by the new owner as they are, and the benefits of the software functions will be obtained by the new owner free of charge. Under these circumstances, there is a demand for a structure for appropriately initializing personal information data and software data stored on the vehicle side is desired.

In the present embodiment, a structure for initializing data stored on the vehicle side is realized by using the structure in which the center device 3 described in FIG. 12 distributes the campaign information and the package and updates the program. That is, since the center device 3 has already established a series of procedures of distributing the campaign information and the package to the vehicle side and updating the program, a new procedure of initializing the data stored on the vehicle side is established by using the series of procedures of updating the program.

the initialization includes a case of erasing the data and a case of rolling back the data. Erasing the data means, for example, to designate an erase initiation address on a memory and a data capacity of an erase target, and erase data stored in a memory area to empty the memory area where the data has been stored. Rolling back the data means, for example, to designate a rollback initiation address on a memory and a data capacity of a rollback target, erase data stored in a memory area, and write data of the past version than the erased data in the memory area where the data has been stored. In this case, when the current version has higher functionality than the past version, downgrading is performed by rolling back the data, and when the current version has lower functionality than the past version, upgrading is performed by rolling back the data. That is, rolling back the data means either a case of downgrading or a case of upgrading. The downgrading may be referred to as version down, and the upgrading may be referred to as version up.

Figure 13:
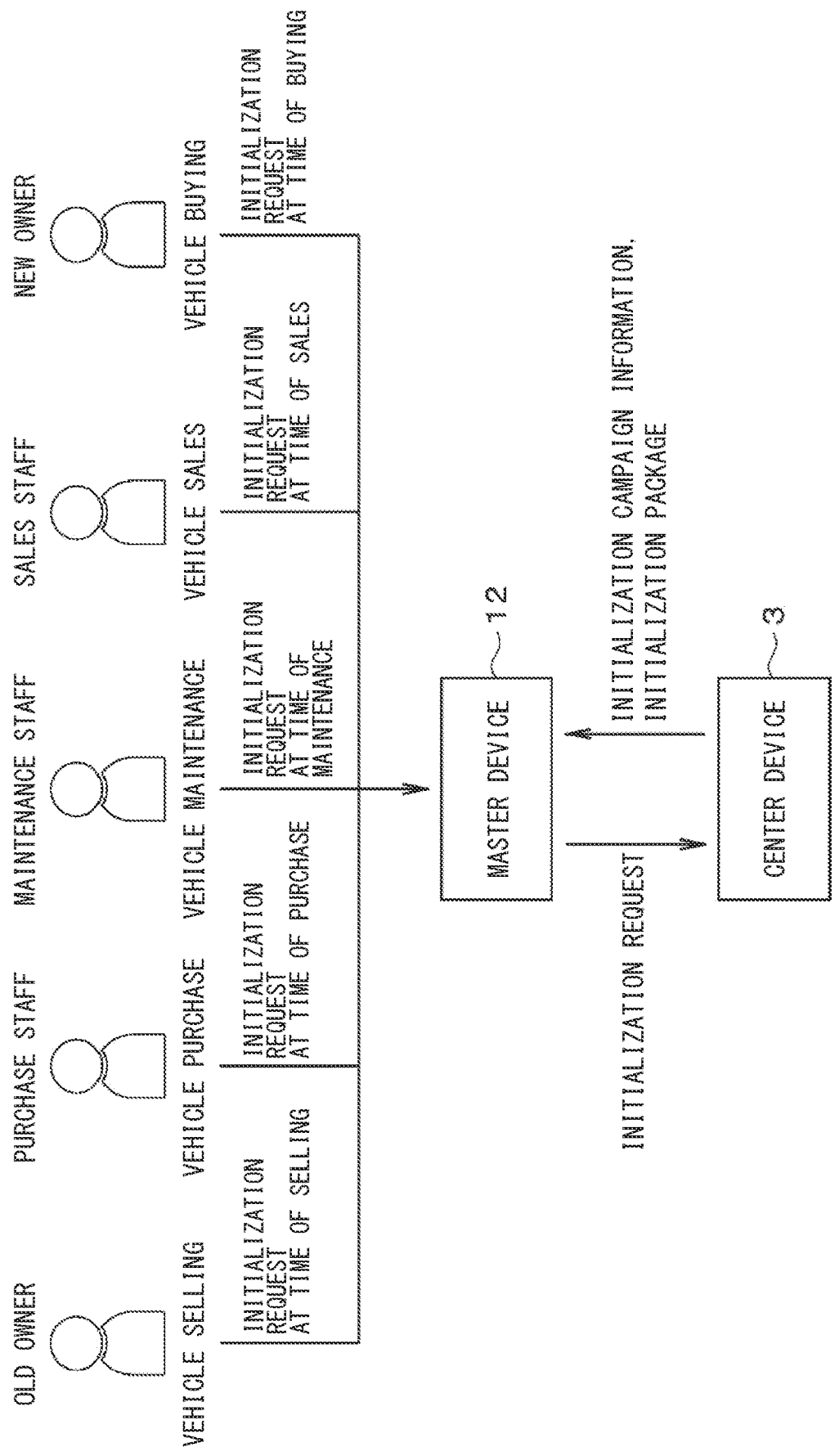
FIG. 13 is a diagram illustrating an aspect in which an initialization request is made.

A flow from an old owner selling a vehicle to a new owner purchasing the vehicle will be described. As illustrated in FIG. 13, it is expected that data will be initialized on several occasions before the old owner sells the vehicle and the new owner purchases the vehicle. For example, when the old owner sells the vehicle to a vehicle purchase business operator, the sold vehicle is maintained at a vehicle maintenance factory, and the new owner purchases the maintained vehicle from a vehicle sales business operator, each of the old owner, a purchase staff of the vehicle purchase business operator, a maintenance staff of the vehicle maintenance factory, a sales staff of the vehicle sales business operator, and the new owner may perform a data initialization operation. When any of the old owner, the purchase staff, the maintenance staff, the sales staff, and the new owner performs a data initialization operation on the in-vehicle display 7, for example, the master device 12 transmits an initialization request to the center device 3.

Upon receiving an initialization request from the master device 12, the center device 3 generates an initialization package, generates initialization campaign information corresponding to the generated initialization package, or selects corresponding initialization campaign information from among multiple pieces of initialization campaign information stored in advance. The center device 3 distributes the generated or selected initialization campaign information to the master device 12, and thus distributes the initialization package to the master device 12. Upon receiving the initialization campaign information from the center device 3 and thus receiving the initialization package, the master device 12 initializes initialization target data.

Upon receiving an erase program as the initialization package from the center device 3, the master device 12 erases software data by executing the erase program in the rewrite target ECU 20, and upon receiving an erase command as the initialization package from the center device 3, the master device 12 erases the software data by transmitting the erase command to the rewrite target ECU 20. Upon receiving a rollback program as the initialization package from the center device 3, the master device 12 rolls back software data by executing the rollback program in the rewrite target ECU 20, and upon receiving a rollback command as the initialization package from the center device 3, the master device 12 rolls back the software data by transmitting the rollback command to the rewrite target ECU 20.

Next, initialization target data will be described. As illustrated in FIG. 14, the initialization target data is classified into, for example, a first category, a second category, and a third category according to an initialization mode. Data classified as the first category is data of a type that is unconditionally erased, for example, personal information data, and content of software data that does not include important functions. The personal information is information that can specify an individual, for example, a name, an address, a telephone number, an e-mail address, and a credit card ID registered on the in-vehicle display 7, a map application including the vicinity of user's home used in the navigation ECU, and the like The data classified as the first category is data that does not remain on the vehicle side by being erased, and data that is preferably erased when the vehicle is bought, sold, or transferred, or data that does not influence a vehicle behavior even though the data does not remain on the vehicle side.

Data classified as the second category is data of a type that the user can select to erase or roll back, and is for example, paid content and customized content among pieces of software data. For the data classified as the second category, software data that the user has selected to erase does not remain on the vehicle side by being erased, and software data that the user has selected to roll back remains on the vehicle side by being rolled back. For example, erasing paid content or rolling back from customized content to default content corresponds to the above case.

Data classified as the third category is data of a type that is unconditionally rolled back, and is, for example, recall content, free content, and content including important functions, among the pieces of software data The data classified as the third category is data that remains on the vehicle side by being rolled back, and is preferably data that remains when the vehicle is bought, sold, or transferred, or data that may influence a behavior of the vehicle if the data erased from the vehicle side. The rollback here also includes installation of the latest recall content.

Figure 15:
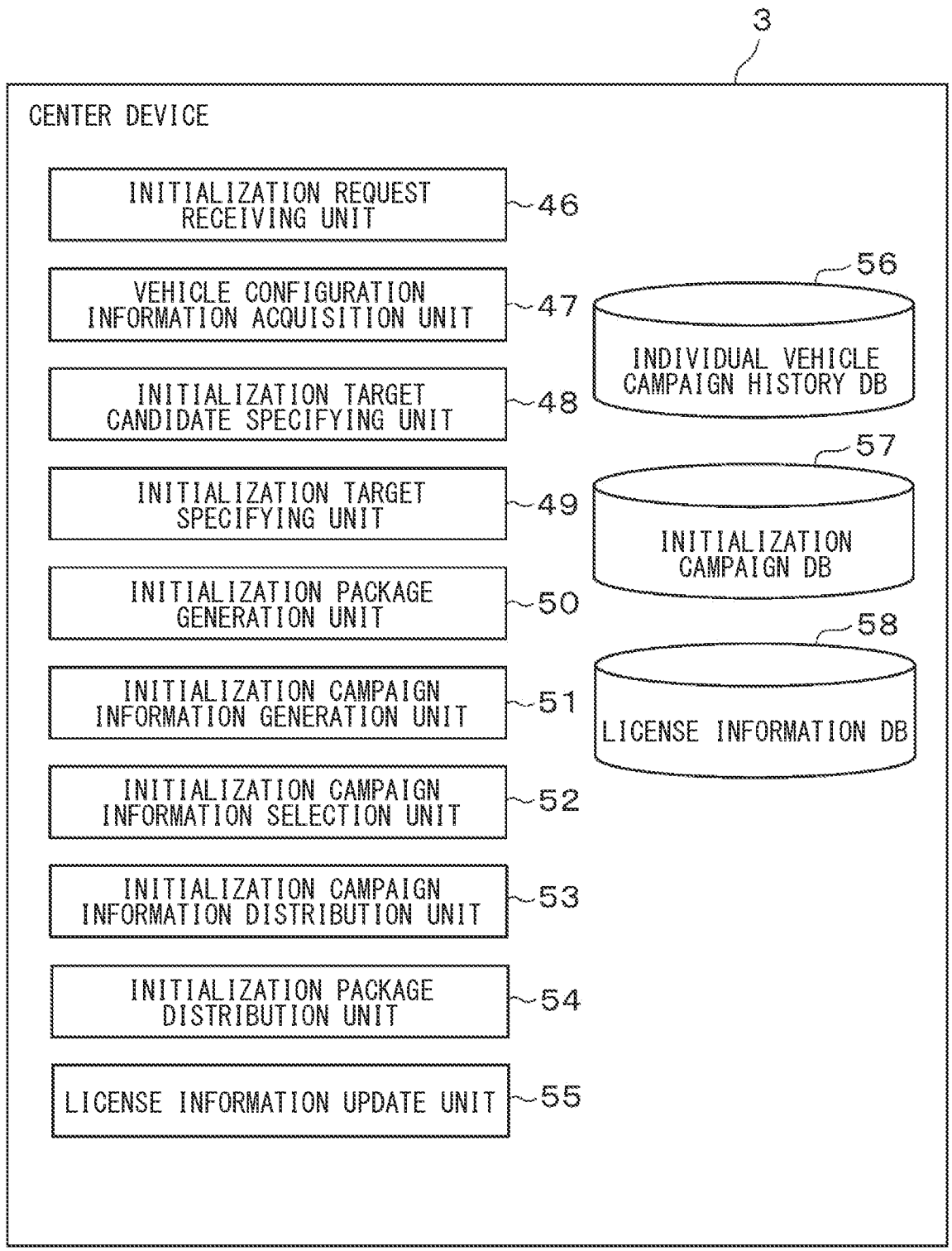
FIG. 15 is a functional block diagram of the center device.

In addition to the functional block described with reference to FIG. 2, the center device 3 has a functional block for realizing a structure for initializing data stored on the vehicle side, as illustrated in FIG. 15. The center device 3 includes an initialization request receiving unit 46, a vehicle configuration information acquisition unit 47, an initialization target candidate specifying unit 48, an initialization target specifying unit 49, an initialization package generation unit 50, an initialization campaign information generation unit 51, an initialization campaign information selection unit 52, an initialization campaign information distribution unit 53, an initialization package distribution unit 54, an license information update unit 55, an individual vehicle campaign history DB 56 (corresponding to a first storage unit), an initialization campaign DB 57 (corresponding to a second storage unit), and a license information DB 58 (corresponding to a third storage unit).

Figure 16:
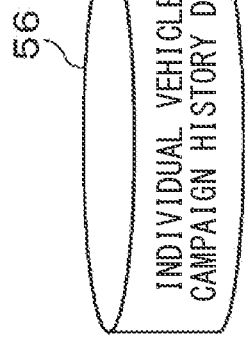
FIG. 16 is a diagram illustrating an individual vehicle campaign history DB.

As illustrated in FIG. 16, in the individual vehicle campaign history DB 56, a distribution history of the campaign information for each individual vehicle is registered, and a campaign ID, a campaign type, the presence or absence of billing, and the like are registered. As illustrated in FIG. 17, in the initialization campaign DB 57, an ID of the initialization campaign information, an ID of the initialization package, message information such as a text statement indicating specific initialization details as details of the initialization campaign information, a list of "VINs" which are IDs of vehicles that are targets of the initialization campaign information, a list of "Vehicle SW IDs" before and after initialization, a list of "ECU SW IDs" before and after initialization, and the like are registered. The initialization campaign DB 57 has the same data structure as that of the campaign DB 45 described with reference to FIG. 10, that is, the initialization campaign information registered in the initialization campaign DB 57 has the same data structure as that of the campaign information registered in the campaign DB 45. That is, the initialization campaign information has a predetermined data structure including an explanation that the program is updated for initialization, an ID of the package file to be downloaded, program update conditions, and the like.

As described above, upon receiving an initialization request from the master device 12 by any of the old owner, the purchase staff, the maintenance staff, the sales staff, and the new owner performing a data initialization operation on the in-vehicle display 7, the initialization request receiving unit 46 receives the data initialization request. The vehicle configuration information acquisition unit 47 acquires vehicle configuration information from the master device 12.

When the data initialization request is received by the initialization request receiving unit 46, the initialization target candidate specifying unit 48 specifies initialization target candidate data by referring to the vehicle configuration information acquired by the vehicle configuration information acquisition unit 47 and the distribution history of the campaign information for each individual vehicle stored in the individual vehicle campaign history DB 56. The initialization target candidate data is data that can be initialization target data.

When the initialization target candidate data is specified by the initialization target candidate specifying unit 48, the initialization target specifying unit 49 specifies initialization target data from the specified initialization target candidate data. The initialization target specifying unit 49 specifies, for example, data of which initialization is selected by the user operating the in-vehicle display 7 from the initialization target candidate data as the initialization target data, and does not specify data of which initialization is not selected as the initialization target data.

When the initialization target data is specified by the initialization target specifying unit 49, the initialization package generation unit 50 generates an initialization package for initializing the specified initialization target data. The initialization package includes rewrite specification data having the same data structure as that of the package rewrite specification data at the time of program update described above. In this case, the master device 12 initializes the software data based on the specification data included in the initialization package received from the center device 3. That is, the specification data included in the initialization package is data that defines operations related to software data initialization in the DCM 13, the CGW 14, the rewrite target ECU 20, and the like, and information related to the software data initialization includes information that can specify the rewrite target ECU 20, information that can specify an initialization order when there are multiple rewrite target ECUs 20, information that can specify a rollback method, and the like. By referring to the specification data included in the initialization package, the CGW 14 specifies the rewrite target ECU 20 that is an initialization target from among multiple rewrite target ECUs 20 mounted on the vehicle, specifies initialization target software from among pieces of software stored in the rewrite target ECU 20 specified as an initialization target, and specifies whether to erase or roll back data of the software specified as the initialization target. The initialization package generation unit 50 may be provided in addition to the center device 3. For example, the center device 3 may acquire an initialization package generated by an information processing apparatus other than the center device 3.

When the initialization package is generated by the initialization package generation unit 50, if multiple pieces of initialization campaign information are not stored in the initialization campaign DB 57, or if initialization campaign information corresponding to the initialization package is not stored although initialization campaign information is stored in the initialization campaign DB 57, the initialization campaign information generation unit 51 generates initialization campaign information corresponding to the generated initialization package.

When the initialization package is generated by the initialization package generation unit 50, if the initialization campaign information is stored in the initialization campaign DB 57 and the initialization campaign information corresponding to the initialization package is stored, the initialization campaign information selection unit 52 selects the initialization campaign information corresponding to the initialization package.

When the initialization campaign information is generated by the initialization campaign information generation unit 51 or the initialization campaign information is selected by the initialization campaign information selection unit 52, the initialization campaign information distribution unit 53 distributes the generated or selected initialization campaign information to the master device 12. When a download approval notification is received from the DCM 13 after the initialization campaign information distribution unit 53 distributes the initialization campaign information to the master device 12, the initialization package distribution unit 54 distributes the initialization package generated by the initialization package generation unit 50 to the master device 12.

When the initialization campaign information distribution unit 53 distributes the initialization campaign information, the license information update unit 55 updates software license information stored in the license information DB 58.

A specific example of the initialization package will be described below.

Referring to FIG. 5 described above, when, for example, the "Vehicle SW ID" to be initialized is "0001", the initialization package generation unit 50 selects an ECU program to be updated to a program corresponding to "ads_001", "eng_010", "brk_001", and "eps_010", generates a package file, and stores the generated package file in the package DB 34 as an initialization package. That is, if ECUs of the current vehicle are "ads_003", "eng_020", "brk_005", and "eps_012", the initialization package generation unit 50 generates difference data for returning "ads_003" to "ads_001", "eng_020" to "eng_010", "brk_005" to "brk_001", and "eps_012" to "eps_010", generate a package file "pkg_000.dat", and stores the generated package file as the initialization package in the package DB 34. When a predetermined program or predetermined data is erased, the initialization package generation unit 50 generates a package file including commands for erasing the program or the data instead of the ECU program or in addition to the ECU program.

If the program is updated to "Vehicle SW ID"="0002" by the latest recall, the initialization package generation unit 50 selects not "0001" but "0002" corresponding to the latest recall as a "Vehicle SW ID" of an initialization target. In that case, as illustrated in FIG. 17, if the ECUs of the current vehicle are "ads_003", "eng_020", "brk_005", and "eps_012", the initialization package generation unit 50 selects difference data for returning "ads_003" to "ads_002", "eng_020" to "eng_010", "brk_005" to "brk_005", and "eps_012" to "eps_011", generate a package file "pkg_000.dat", and stores the generated package file in the package DB 34 as an initialization package.

For example, when "eps_100" is the content updated for a fee and "eps_011" is the latest content that can be updated free of charge, the initialization package generation unit 50 generates a package file including a program corresponding to "eps_011", and stores the generated package file in the package DB 34 as an initialization package.

For example, when "xxx 100" is the content added for a fee, the initialization package generation unit 50 generates a package file including a command for erasing the content added for a fee, and stores the generated package file in the package DB 34 as an initialization package.

Figure 18:
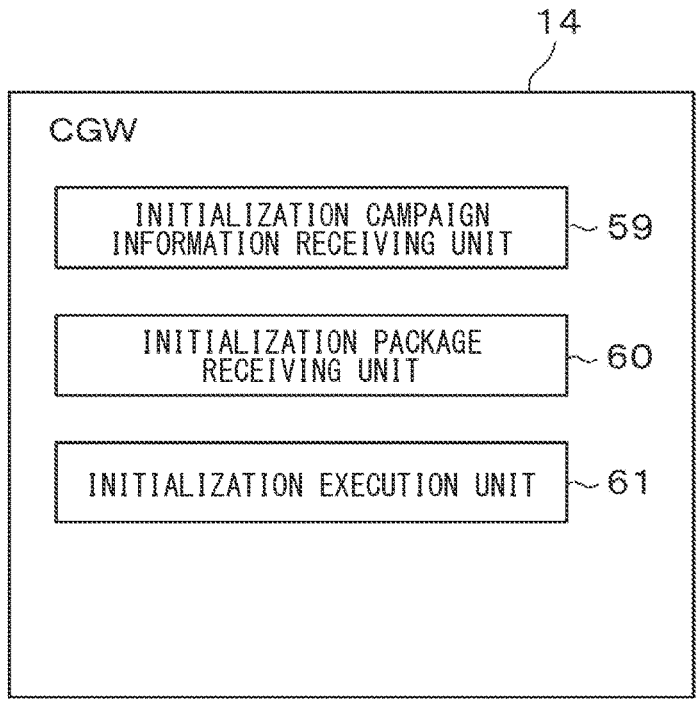
FIG. 18 is a functional block diagram of a master device.

As illustrated in FIG. 18, the CGW 14 has a functional block for receiving initialization campaign information. The master device 12 has an initialization campaign information receiving unit 59, an initialization package receiving unit 60, and an initialization execution unit 61. The initialization campaign information receiving unit 59 receives the initialization campaign information from the center device 3. The initialization package receiving unit 60 receives the initialization package from the center device 3. When the initialization campaign information is received by the initialization campaign information receiving unit 59 and the initialization package is received by the initialization package receiving unit 60, the initialization execution unit 61 initializes initialization target data designated by the received initialization package.

Next, an initialization operation performed by a user will be described with reference to FIGS. 19 to 24. The user referred to here is any of the above old owner, purchase staff, maintenance staff, sales staff, and new owner. Although a screen displayed by the in-vehicle display 7 will be described here, the same applies to a screen displayed by the mobile terminal 6. That is, the user can perform an initialization operation on either the in-vehicle display 7 or the mobile terminal 6. When the user performs the initialization operation on the in-vehicle display 7, the initialization operation is performed under a condition that the master device 12 and the center device 3 can perform data communication. When the user performs the initialization operation on the mobile terminal 6, the initialization operation is performed under a condition that the master device 12 and the center device 3 can perform data communication, and the mobile terminal 6 and the center device 3 can perform data communication. In a screen that will be described later, a layout of the number, disposition, and the like of buttons may be a layout other than an exemplified layout.

Figure 19:
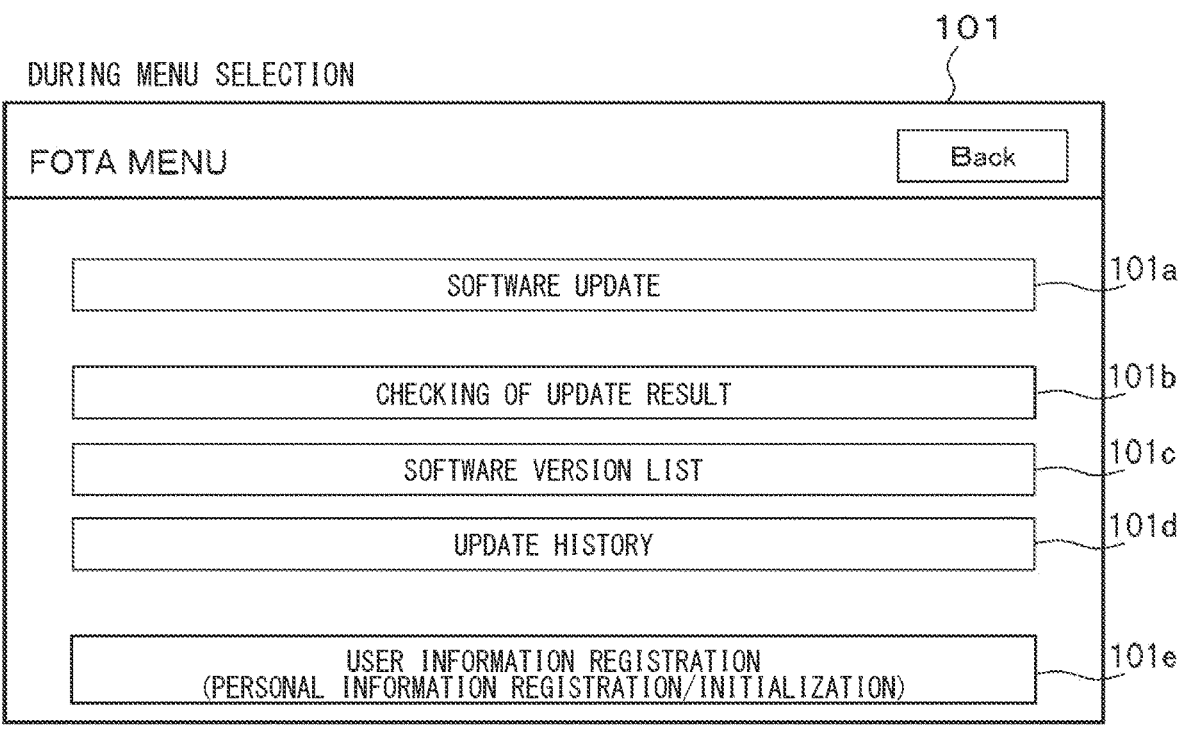
FIG. 19 is a diagram illustrating a menu screen.

When the user performs a menu screen display operation on the in-vehicle display 7, the CGW 14 displays a menu selection screen 101 on the in-vehicle display 7 as illustrated in FIG. 19. The CGW 14 displays a "software update" button 101a, an "update result check" button 101b, a "software version list" button 101c, an "update history" button 101d, and a "user information registration" button 101e on the menu selection screen 101, and waits for the user's operation.

Figure 20:
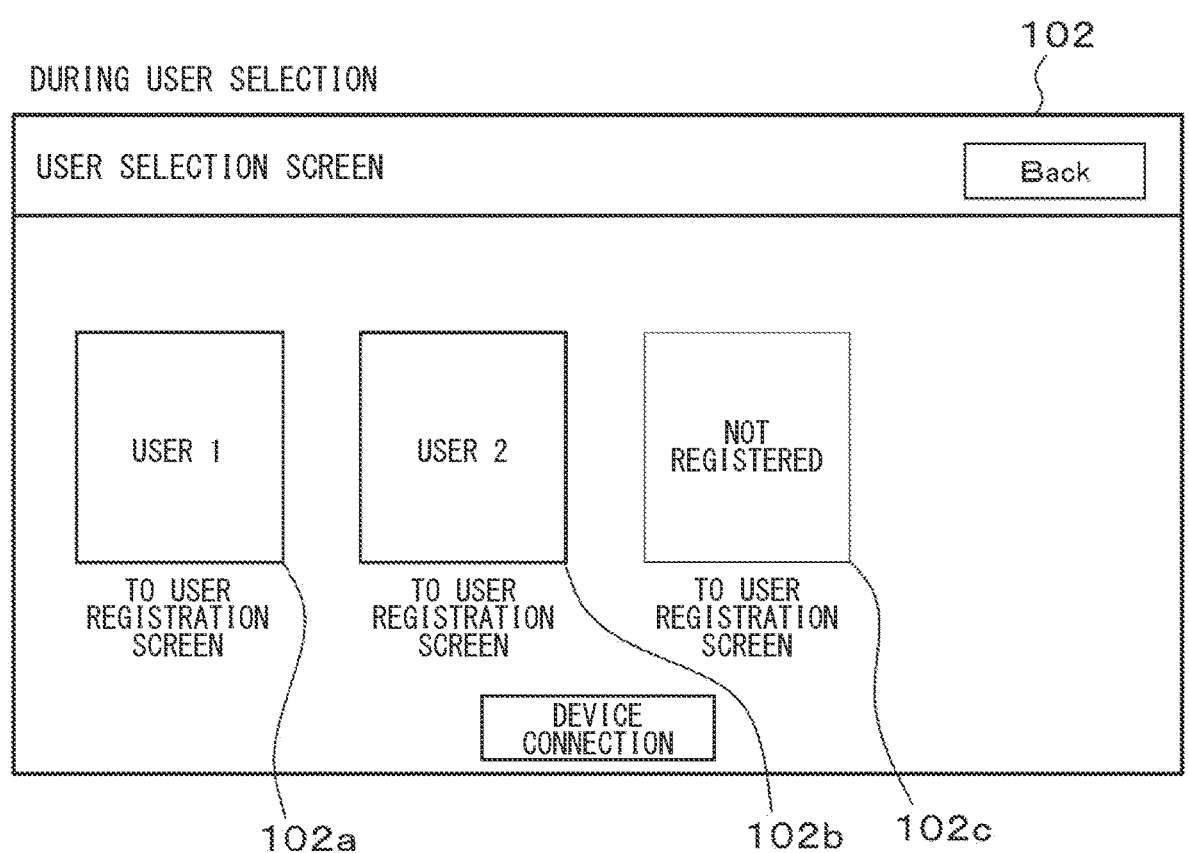
FIG. 20 is a diagram illustrating a user selection screen.

When the user operates the "user information registration" button 101e in this state, the CGW 14 displays a user selection screen 102 on the in-vehicle display 7 as illustrated in FIG. 20. The CGW 14 displays "user" buttons 102a to 102c on the user selection screen 102, and waits for the user's operation.

Figure 21:
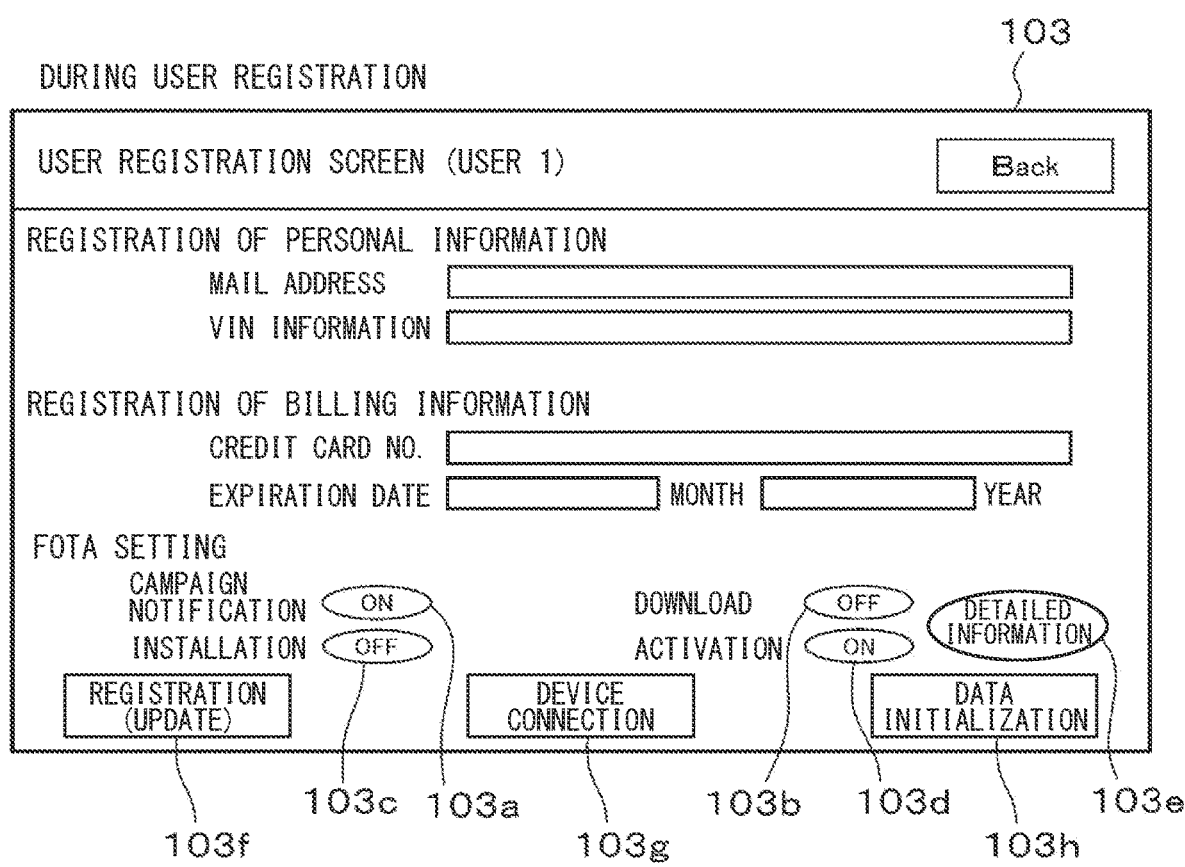
FIG. 21 is a diagram illustrating a user registration screen.

When the user operates the "user" button 102a in this state, the CGW 14 displays a user registration screen 103 on the in-vehicle display 7 as illustrated in FIG. 21. On the user registration screen 103, the CGW 14 displays entry fields for e-mail address and VIN information as personal information registration, displays entry fields for a credit card number and expiration date entry field as billing information registration, displays "on-off" buttons 103a to 103d for campaign notification, download, installation, and activation as rewrite settings of an application program, displays a "detailed information" button 103e, a "registration" button 103f, a "device connection" button 103g, and a "data initialization" button 103h, and waits for the user's operation. The VIN information is individual vehicle identification information.

The "on-off" buttons 103a to 103d for campaign notification, download, installation, and activation are buttons for selecting whether to display screens for campaign notification, download, installation, and activation. Specifically, when a campaign notification is received, when download is initiated, when installation is initiated, or when activation is initiated, the buttons are used to allow the user to select in advance whether to display content that requires user approval.

The "detailed information" button 103e is a button for registering expiration date information and position information. The expiration date information is information indicating the expiration date, and is information serving as a criterion for determining whether rewriting of an application program is to be executed. The CGW 14 rewrites the application program if the current time is within the expiration date indicated by the expiration date information, and does not rewrite the application program if the current time is outside the expiration date indicated by the expiration date information. The position information is information indicating a position, is information serving as a criterion for determining whether rewriting of the application program is to be executed, and includes a permitted area and a prohibited area. When the permitted area is designated as the position information, the CGW 14 executes rewriting of the application program if the current position of the vehicle is within the permitted area indicated by the position information, and does not execute rewriting of the application program if the current position of the vehicle is outside the permitted area indicated by the position information. When the prohibited area is designated as the position information, the CGW 14 executes rewriting of the application program if the current position of the vehicle is outside the prohibited area indicated by the position information, and does not execute rewriting of the application program if the current position of the vehicle is within the prohibited area indicated by the position information.

The "registration" button 103f is a button used for the next user to register new personal information. The "device connection" button 103g is a button for connecting the in-vehicle display 7 to another device. The "data initialization" button 103h is a button for initializing the personal information data registered in the in-vehicle display 7 and the software data stored in the rewrite target ECU 20.

Figure 22:
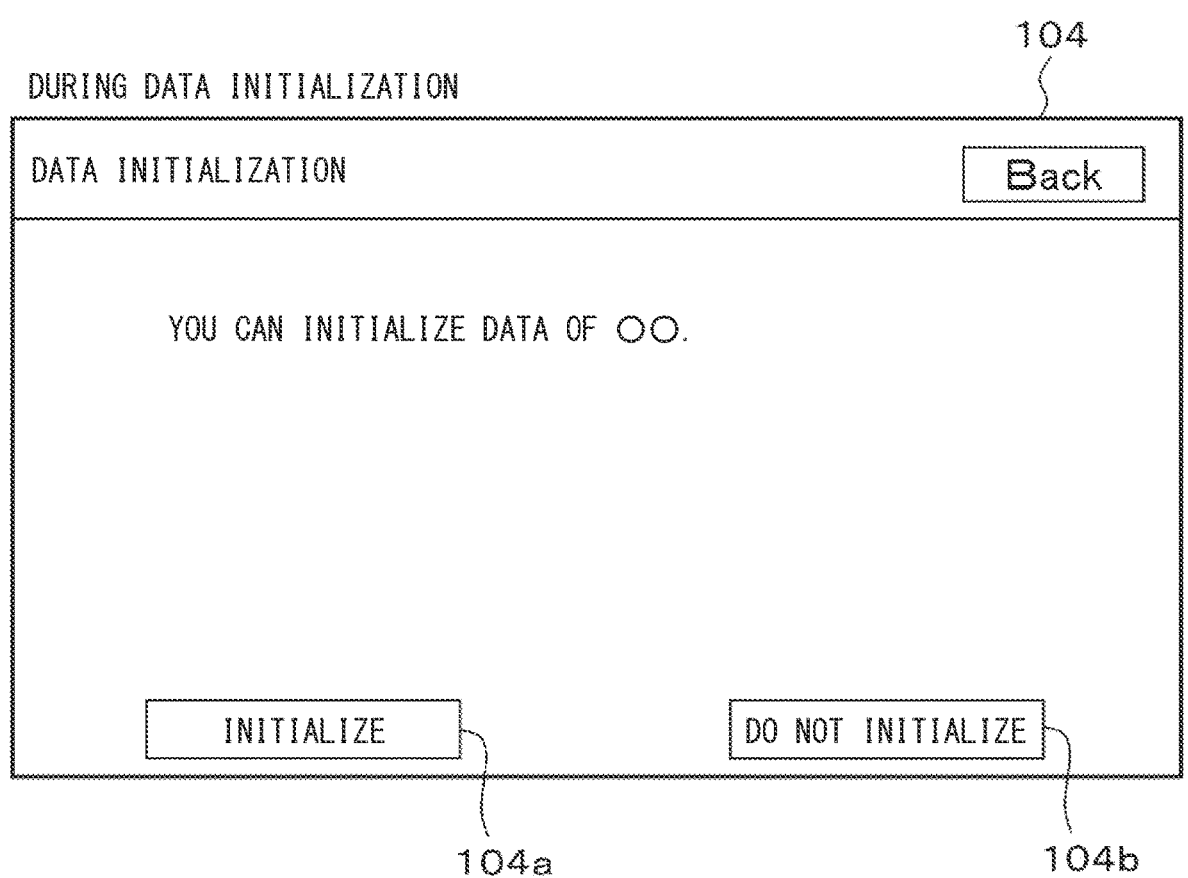
FIG. 22 is a diagram illustrating a first initialization screen.
Figure 23:
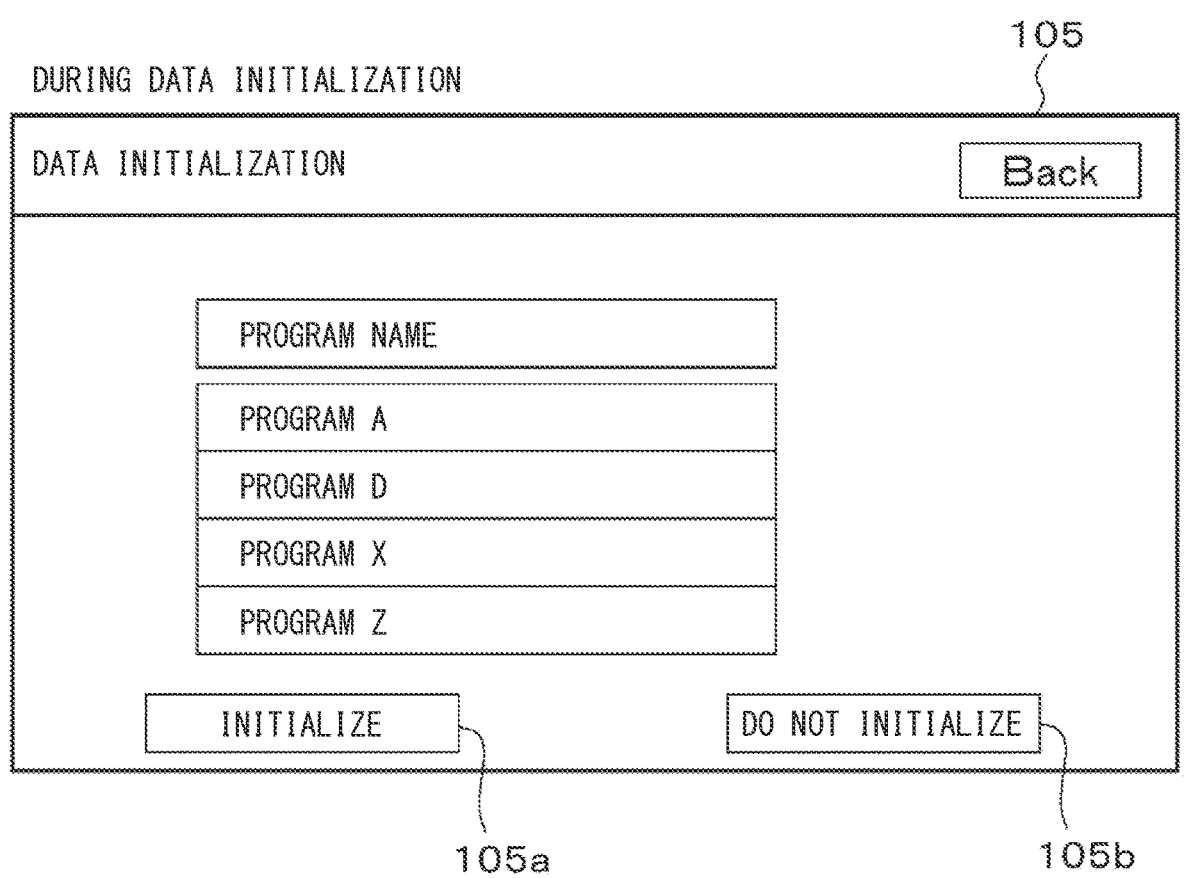
FIG. 23 is a diagram illustrating a second initialization screen.
Figure 24:
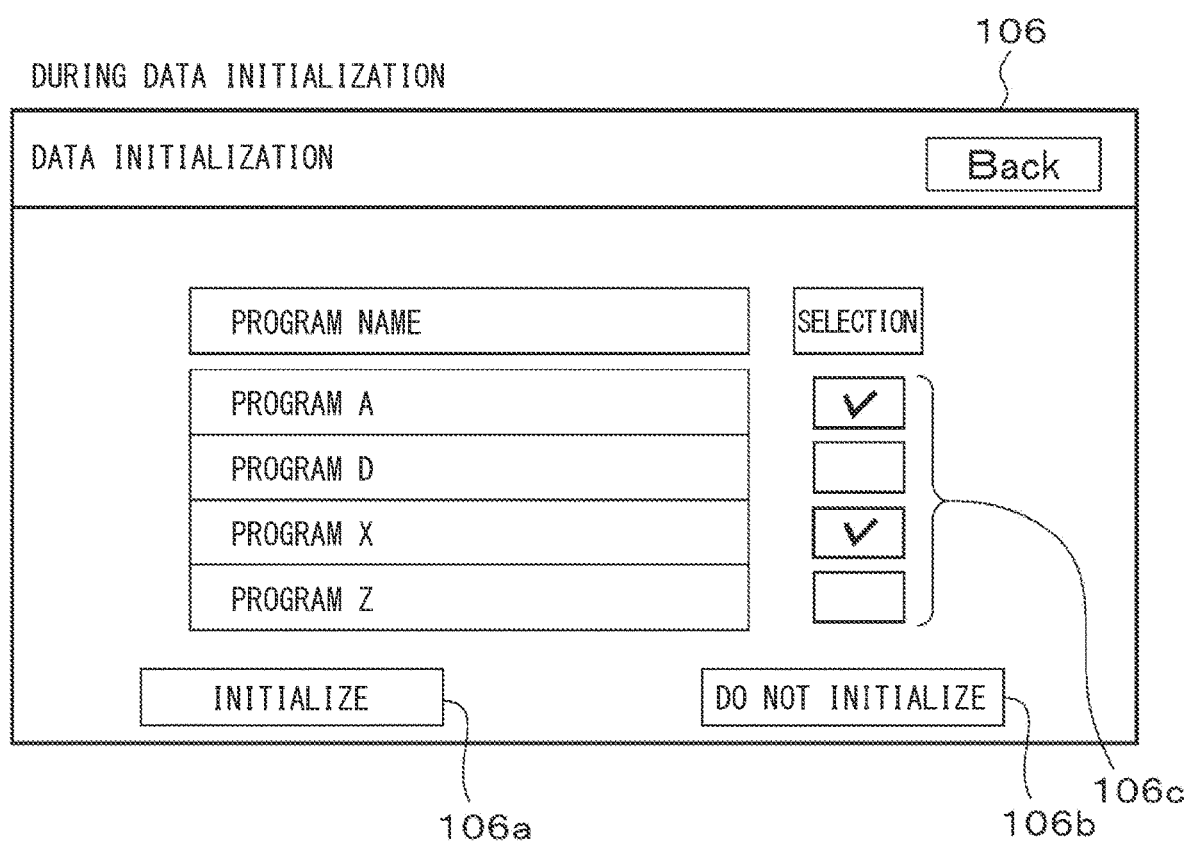
FIG. 24 is a diagram illustrating a third initialization screen.

When the user operates the "data initialization" button 103h in this state, the CGW 14 transmits an initialization request to the center device 3, and as illustrated in FIGS. 22 to 24, depending on modes of initializing data, initialization screens 104 to 106 are displayed on the in-vehicle display 7.

As modes of initializing data, the center device 3 manages a first initialization mode of initializing data of all software other than basic control software among pieces of software stored in the rewrite target ECU 20, a second initialization mode in which data of some software other than the basic control software is initialized such that the user cannot select the data as an initialization target among the pieces of software stored in the rewrite target ECU 20, and a third initialization mode in which the data of some software other than the basic control software is initialized such that the user can select the data as an initialization target among the pieces of software stored in the rewrite target ECU 20. The basic control software is the minimum software required for the rewrite target ECU 20 to operate.

When the center device 3 receives the initialization request from the CGW 14, the center device 3 refers to the campaign information and the package distributed in the past to the CGW 14 that has transmitted the initialization request, and specifies a corresponding initialization mode.

When it is determined that it is necessary to initialize the data of all software other than the basic control software when initializing the data of the software based on the campaign information and the package distributed in the past to the CGW 14 that has transmitted the initialization request, the center device 3 determines that the data of all software other than the basic control software is required to be initialized. In this case, the center device 3 specifies the first initialization mode as a mode of initializing the software data, and transmits the first initialization mode to the CGW 14. Upon receiving the first initialization mode from the center device 3, the CGW 14 displays the first initialization screen 104 illustrated in FIG. 22 and displays the guidance "all data can be initialized", also displays an "initialize" button 104a and a "do not initialize" button 104b, and waits for the user's operation.

When it is determined that it is necessary to initialize the data of some software other than the basic control software when initializing the software data based on the campaign information and the package distributed in the past to the CGW 14 that has transmitted the initialization request, and it is determined that the user cannot select the data, the center device 3 determines that the data of some software other than the basic control software is required to be initialized such that the user cannot select the data as an initialization target. In this case, the center device 3 specifies the second initialization mode as a mode of initializing the software data, and transmits the second initialization mode to the CGW 14. Upon receiving the second initialization mode from the center device 3, the CGW 14 displays the second initialization screen 105 illustrated in FIG. 23, displays a list of programs that are initialization targets, also displays an "initialize" button 105a and a "do not initialize" button 105b, and waits for the user's operation.

When it is determined that it is necessary to initialize the data of some software other than the basic control software when initializing the software data based on the campaign information and the package distributed in the past to the CGW 14 that has transmitted the initialization request, and it is determined that the user can select the data, the center device 3 determines that the data of some software other than the basic control software is required to be initialized such that the user cannot select the data as an initialization target. In this case, the center device 3 specifies the third initialization mode as a mode of initializing the software data, and transmits the third initialization mode to the CGW 14. Upon receiving the third initialization mode from the center device 3, the CGW 14 displays the third initialization screen 106 illustrated in FIG. 24, displays a list of initialization target candidate programs, also displays a checkbox 106c corresponding to the initialization target candidate program in the initialization target candidate programs, displays an "initialize" button 106a and a "do not initialize" button 106b, and waits for the user's operation.

Next, an operation of the above configuration will be described with reference to FIGS. 25 to 39. A case where data is initialized according to each initialization mode will be described.

(1) When Data is Initialized According to First Initialization Mode

Figure 25:
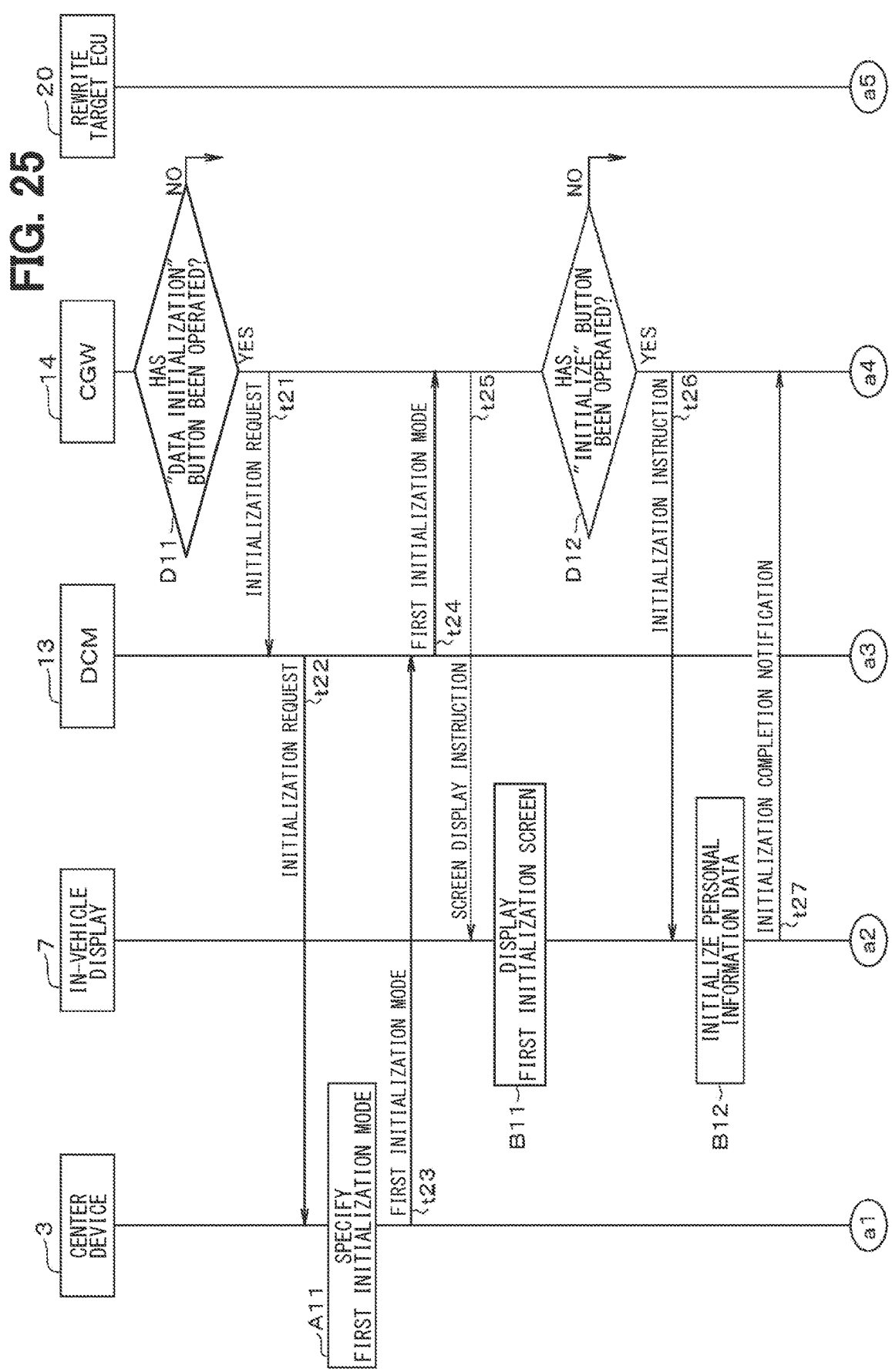
FIG. 25 is a diagram illustrating a processing flow.

The case where data is initialized according to the first initialization mode will be described with reference to FIGS. 25 and 26. When the CGW 14 determines that the user has operated the "data initialization" button 103h on the user registration screen (D11: YES), the CGW 14 causes the DCM 13 to transmit an initialization request to the center device 3 (t21, t22). Upon receiving the initialization request from the CGW 14 via the DCM 13, the center device 3 refers to the campaign information and the package distributed in the past to the CGW 14 that has transmitted the initialization request, and specifies a corresponding initialization mode.

When the center device 3 determines that the data of all software other than the basic control software is required to be initialized, the center device 3 specifies the first initialization mode (A11) and distributes the first initialization mode to the DCM 13 (t23). Upon receiving the first initialization mode from the center device 3, the DCM 13 transfers the received first initialization mode to the CGW 14 (t24). When the first initialization mode is transferred from the DCM 13, the CGW 14 transmits a screen display instruction to the in-vehicle display 7 (t25). Upon receiving the screen display instruction from the CGW 14, the in-vehicle display 7 displays the first initialization screen 104 illustrated in FIG. 20 (B11).

When the CGW 14 determines that the user has operated the "initialize" button 104a on the first initialization screen 104 (D12: YES), the CGW 14 transmits an initialization instruction to the in-vehicle display 7 (t26). Upon receiving the initialization instruction from the CGW 14, the in-vehicle display 7 initializes the registered personal information data (B12). That is, the in-vehicle display 7 initializes the personal information data by erasing the e-mail address, the VIN information, the credit card number, the expiration date, and the like registered by the old owner as personal information data. When the in-vehicle display 7 completes the initialization of the personal information data, the in-vehicle display 7 transmits an initialization completion notification to the CGW 14 (t27). Upon receiving the initialization completion notification from the in-vehicle display 7, the CGW 14 causes the DCM 13 to transmit an initialization campaign request to the center device 3 (t28, t29).

Upon receiving the initialization campaign request from the CGW 14 via the DCM 13, the center device 3 generates an initialization package (A12) and generates initialization package initialization campaign information corresponding to the generated initialization package (A13). After that, the center device 3 waits for distribution of the initialization campaign information and the initialization package.

After that, when the DCM 13 determines that the ignition switch is turned on (C11), the DCM 13 transmits the vehicle configuration information to the center device 3 (t30). When the center device 3 receives the vehicle configuration information from the DCM 13, the center device 3 distributes the initialization campaign information to the DCM 13 (t31). Upon receiving the initialization campaign information from the center device 3, the DCM 13 transfers the received initialization campaign information to the CGW 14 (t32).

When the initialization campaign information is transferred from the DCM 13, the CGW 14 displays the initialization campaign notification screen on the in-vehicle display 7 and asks the user to approve or reject download of the initialization package. The user can select whether to approve or reject the download of the initialization package on the initialization campaign notification screen. When the user selects the download approval (D13), the CGW 14 distributes a download approval notification to the DCM 13 (t32). Upon receiving the download approval notification from the CGW 14, the DCM 13 transmits the received download approval notification to the center device 3 (t33).

Upon receiving the download approval notification from the DCM 13, the center device 3 distributes the initialization package to the DCM 13 (t35). Upon receiving the initialization package from the center device 3, the DCM 13 transfers the received initialization package to the CGW 14 (t36). When the initialization campaign information and the initialization package are transferred from the DCM 13, the CGW 14 transmits an initialization instruction to the rewrite target ECU 20 (t37), and initializes software data stored in the rewrite target ECU 20 (E11). That is, the CGW 14 initializes the software data by erasing or rolling back the software data stored in the rewrite target ECU 20.

As described above, the user performs the initialization operation according to the first initialization screen displayed on the in-vehicle display 7 and can thus erase and initialize the personal information data of the old owner registered in the in-vehicle display 7. After that, by turning on the ignition switch, the user can erase or roll back all the software data other than the basic control software among the pieces of software data stored in the rewrite target ECU 20 to initialize the software data.

(2) When Data is Initialized According to Second Initialization Mode

Figure 27:
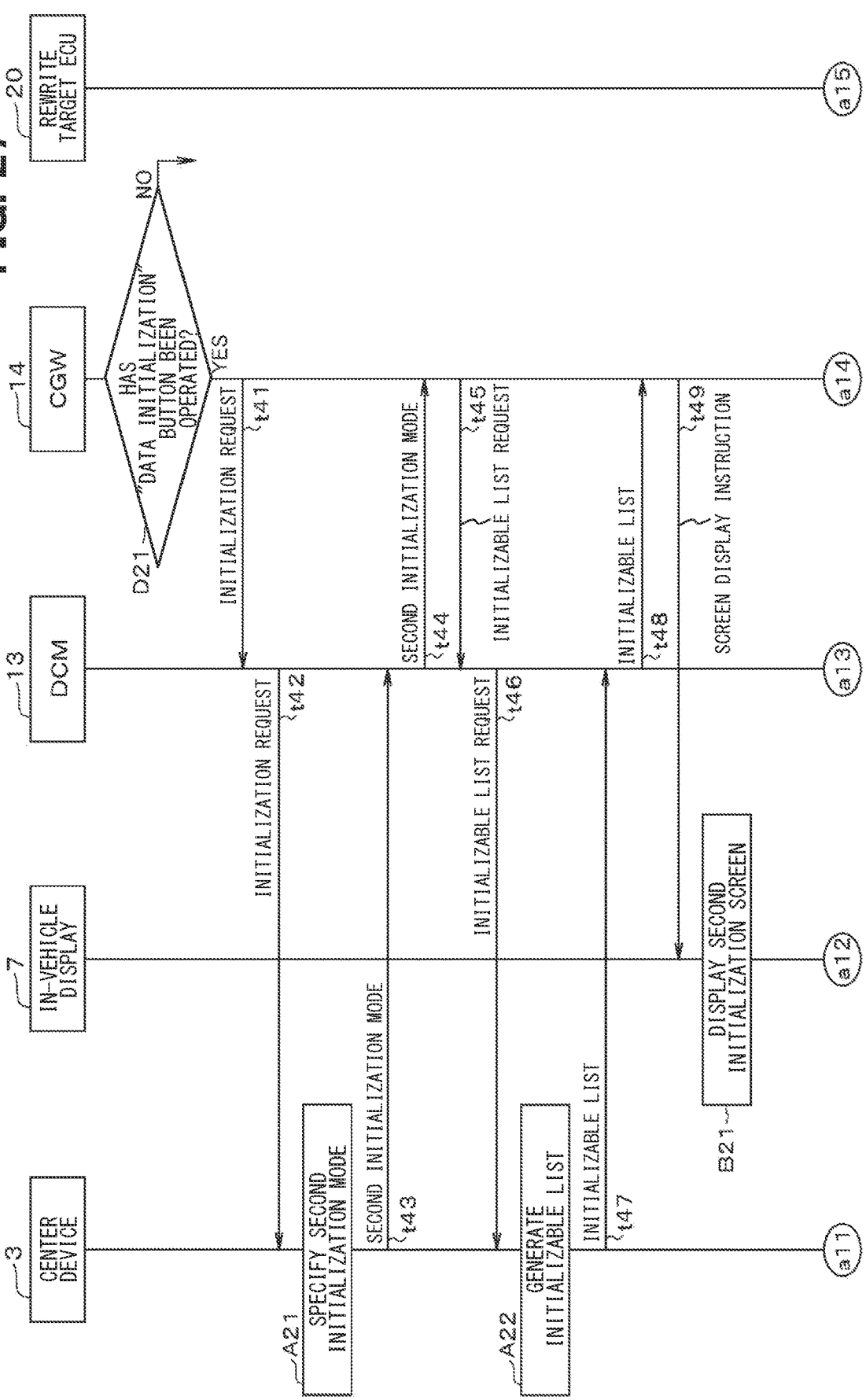
FIG. 27 is a diagram illustrating a processing flow.
Figure 28:
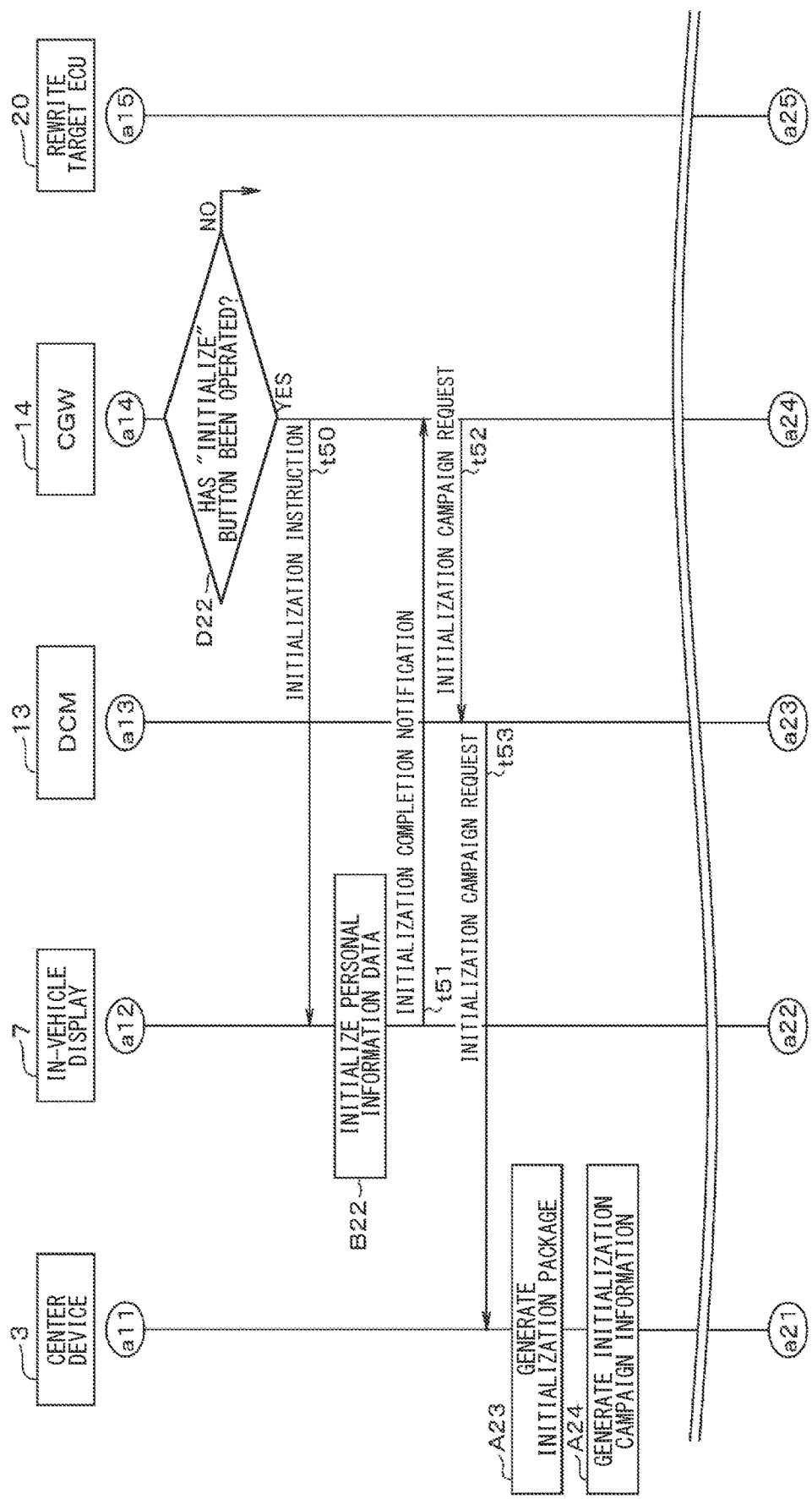
FIG. 28 is a diagram illustrating a processing flow.

The case where the data is initialized according to the second initialization mode will be described with reference to FIGS. 27 to 29. When the CGW 14 determines that the user has operated the "data initialization" button 103h on the user registration screen (D21: YES), the CGW 14 causes the DCM 13 to transmit an initialization request to the center device 3 (t41, t42). Upon receiving the initialization request from the CGW 14 via the DCM 13, the center device 3 refers to the campaign information and the package distributed in the past to the CGW 14 that has transmitted the initialization request, and determines a corresponding initialization mode.

When it is determined that it is necessary to initialize the data of some software other than the basic control software such that the user cannot select the data as an initialization target, the center device 3 specifies the second initialization mode (A21), and distributes the second initialization mode to the DCM 13 (t43). Upon receiving the second initialization mode from the center device 3, the DCM 13 transfers the received first initialization mode to the CGW 14 (t44). When the second initialization mode is transferred from the DCM 13, the CGW 14 causes the DCM 13 to transmit an initializable list request to the center device 3 (t45, t46).

Upon receiving the initializable list request from the CGW 14 via the DCM 13, the center device 3 generates an initializable list (A22) and transmits the generated initializable list to the DCM 13 (t47). When the DCM 13 receives the initializable list from the center device 3, the DCM 13 transfers the received initializable list to the CGW 14 (t48). When the initializable list is transferred from the DCM 13, the CGW 14 transmits a screen display instruction to the in-vehicle display 7 (t49). Upon receiving the screen display instruction from the CGW 14, the in-vehicle display 7 displays the second initialization screen 105 illustrated in FIG. 21 (B21).

When the CGW 14 determines that the user has operated the "initialize" button 105a on the second initialization screen 105 (D22: YES), the CGW 14 transmits an initialization instruction to the in-vehicle display 7 (t50). Upon receiving the initialization instruction from the CGW 14, the in-vehicle display 7 initializes the registered personal information data (B22). That is, the in-vehicle display 7 initializes the personal information data by erasing the e-mail address, the VIN information, the credit card number, the expiration date, and the like registered by the old owner as personal information data. When the in-vehicle display 7 completes the initialization of the personal information data, the in-vehicle display 7 transmits an initialization completion notification to the CGW 14 (t51). Upon receiving the initialization completion notification from the in-vehicle display 7, the CGW 14 causes the DCM 13 to transmit an initialization campaign request to the center device 3 (t52, t53).

Upon receiving the initialization campaign request from the CGW 14 via the DCM 13, the center device 3 generates an initialization package (A23) and generates initialization campaign information corresponding to the generated initialization package (A24). After that, the center device 3 waits for distribution of the initialization campaign information and the initialization package.

After that, when the DCM 13 determines that the ignition switch is turned on (C21), the DCM 13 transmits the vehicle configuration information to the center device 3 (t54). Upon receiving the vehicle configuration information from the DCM 13, the center device 3 distributes the initialization campaign information to the DCM 13 (t55). Upon receiving the initialization campaign information from the center device 3, the DCM 13 transfers the received initialization campaign information to the CGW 14 (t56).

When the initialization campaign information is transferred from the DCM 13, the CGW 14 displays the initialization campaign notification screen on the in-vehicle display 7 and asks the user to approve or reject download of the initialization package. The user can select whether to approve or reject the download of the initialization package on the initialization campaign notification screen. When the user selects the download approval (D23), the CGW 14 distributes a download approval notification to the DCM 13 (t57). Upon receiving the download approval notification from the CGW 14, the DCM 13 transmits the received download approval notification to the center device 3 (t58).

Upon receiving the download approval notification from the DCM 13, the center device 3 distributes the initialization package to the DCM 13 (t59). Upon receiving the initialization package from the center device 3, the DCM 13 transfers the received initialization package to the CGW 14 (t60). When the initialization campaign information and the initialization package are transferred from the DCM 13, the CGW 14 transmits an initialization instruction to the rewrite target ECU 20 (t61), and initializes software data stored in the rewrite target ECU 20 (E21). That is, the CGW 14 initializes the software data by erasing or rolling back the software data stored in the rewrite target ECU 20.

As described above, the user performs the initialization operation according to the second initialization screen displayed on the in-vehicle display 7 and can thus erase and initialize the personal information data of the old owner registered in the in-vehicle display 7. After that, by turning on the ignition switch, the user can erase or roll back some software data other than the basic control software among the pieces of software data stored in the rewrite target ECU 20 to initialize the software data such that the software data cannot be selected.

(3) When Data is Initialized According to Third Initialization Mode

Figure 30:
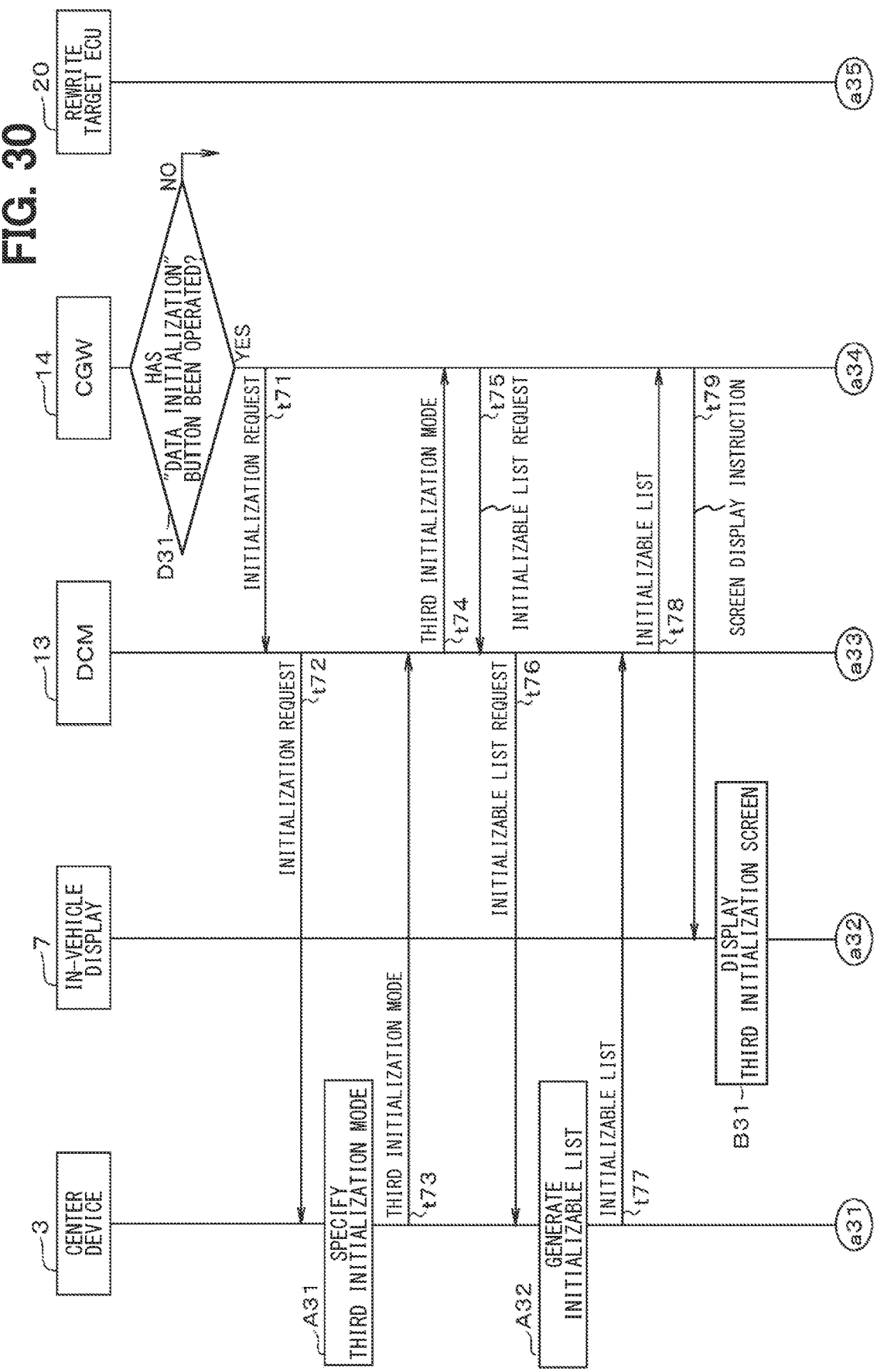
FIG. 30 is a diagram illustrating a processing flow.
Figure 31:
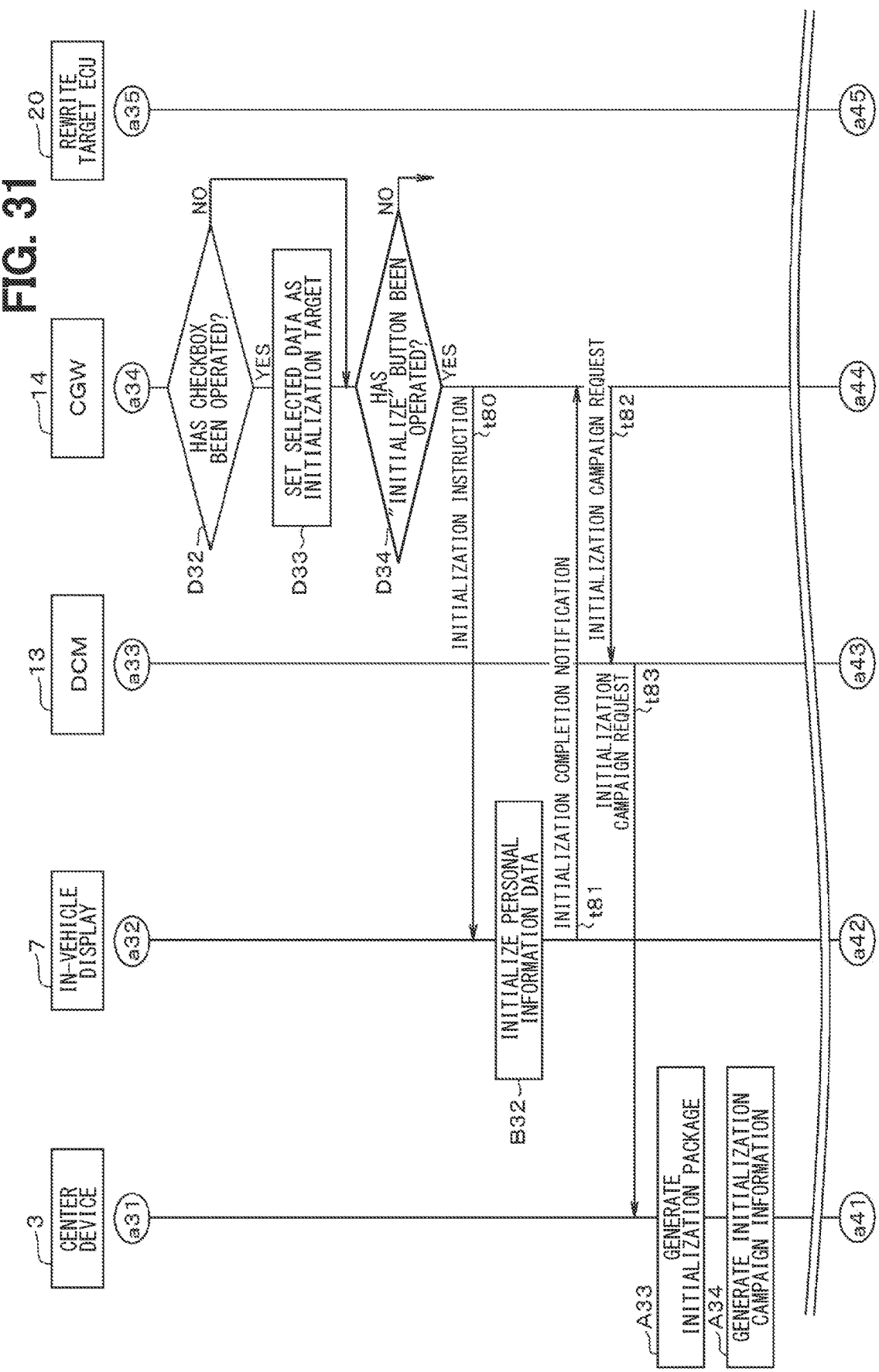
FIG. 31 is a diagram illustrating a processing flow.

The case where data is initialized according to the third initialization mode will be described with reference to FIGS. 30 to 32. When the CGW 14 determines that the user has operated the "data initialization" button 103h on the user registration screen (D31: YES), the CGW 14 causes the DCM 13 to transmit an initialization request to the center device 3 (t71, t72). Upon receiving the initialization request from the CGW 14 via the DCM 13, the center device 3 refers to the campaign information and the package distributed in the past to the CGW 14 that has transmitted the initialization request, and determines a corresponding initialization mode.

When it is determined that it is necessary to initialize the data of some software other than the basic control software such that the user can select the data as an initialization target, the center device 3 specifies the third initialization mode (A31), and distributes the third initialization mode to DCM13 (t73). Upon receiving the third initialization mode from the center device 3, the DCM 13 transfers the received third initialization mode to the CGW 14 (t74). When the third initialization mode is transferred from the DCM 13, the CGW 14 causes the DCM 13 to transmit an initializable list request to the center device 3 (t75, t76).

Upon receiving the initializable list request from the CGW 14 via the DCM 13, the center device 3 generates an initializable list (A32) and distributes the generated initializable list to the DCM 13 (t77). Upon receiving the initializable list from the center device 3, the DCM 13 transfers the received initializable list to the CGW 14 (t78). When the initializable list is transferred from the DCM 13, the CGW 14 transmits a screen display instruction to the in-vehicle display 7 (t79). Upon receiving the screen display instruction from the CGW 14, the in-vehicle display 7 displays the third initialization screen 106 illustrated in FIG. 22 (B31).

When it is determined that the user has operated the checkbox 106*c* on the third initialization screen 106 (D32: YES), the CGW 14 sets the selected software data as an initialization target (D33), and when it is determined that the user has operated the "initialize" button 106*a* on the third initialization screen 106 (D34: YES), the CGW 14 transmits an initialization instruction to the in-vehicle display 7 (t80). Upon receiving the initialization instruction from the CGW 14, the in-vehicle display 7 initializes the registered personal information data (B32). That is, the in-vehicle display 7 initializes the personal information data by erasing the e-mail address, the VIN information, the credit card number, the expiration date, and the like registered by the old owner as personal information data. When the in-vehicle display 7 completes the initialization of the personal information data, the in-vehicle display 7 transmits an initialization completion notification to the CGW 14 (t81). Upon receiving the initialization completion notification from the in-vehicle display 7, the CGW 14 causes the DCM 13 to transmit an initialization campaign request to the center device 3 (t82, t83).

Upon receiving the initialization campaign request from the DCM 13, the center device 3 generates an initialization package (A33) and generates initialization campaign information corresponding to the generated initialization package (A34). After that, the center device 3 waits for distribution of the initialization campaign information and the initialization package.

After that, when the DCM 13 determines that the ignition switch is turned on (C31), the DCM 13 transmits the vehicle configuration information to the center device 3 (t84). Upon receiving the vehicle configuration information from the DCM 13, the center device 3 distributes the initialization campaign information to the DCM 13 (t85). When the DCM 13 receives the initialization campaign information from the center device 3, the DCM 13 transfers the received initialization campaign information to the CGW 14 (t86).

When the initialization campaign information is transferred from the DCM 13, the CGW 14 displays the initialization campaign notification screen on the in-vehicle display 7 and asks the user to approve or reject download of the initialization package. The user can select whether to approve or reject the download of the initialization package on the initialization campaign notification screen. When the user selects the download approval (D35), the CGW 14 distributes a download approval notification to the DCM 13 (t87). Upon receiving the download approval notification from the CGW 14, the DCM 13 transmits the received download approval notification to the center device 3 (t88).

Upon receiving the download approval notification from the DCM 13, the center device 3 distributes the initialization package to the DCM 13 (t89). Upon receiving the initialization package from the center device 3, the DCM 13 transfers the received initialization package to the CGW 14 (t90). When the initialization campaign information and the initialization package are transferred from the DCM 13, the CGW 14 transmits an initialization instruction to the rewrite target ECU 20 (t91), and initializes software data stored in the rewrite target ECU 20 (E31). That is, the CGW 14 initializes the software data by erasing or rolling back the software data stored in the rewrite target ECU 20.

As described above, the user performs the initialization operation according to the third initialization screen displayed on the in-vehicle display 7 and can thus erase and initialize the personal information data of the old owner registered in the in-vehicle display 7. After that, by turning on the ignition switch, the user can erase or roll back some software data other than the basic control software among the pieces of software data stored in the rewrite target ECU 20 to initialize the software data such that the software data can be selected.

Figure 33:
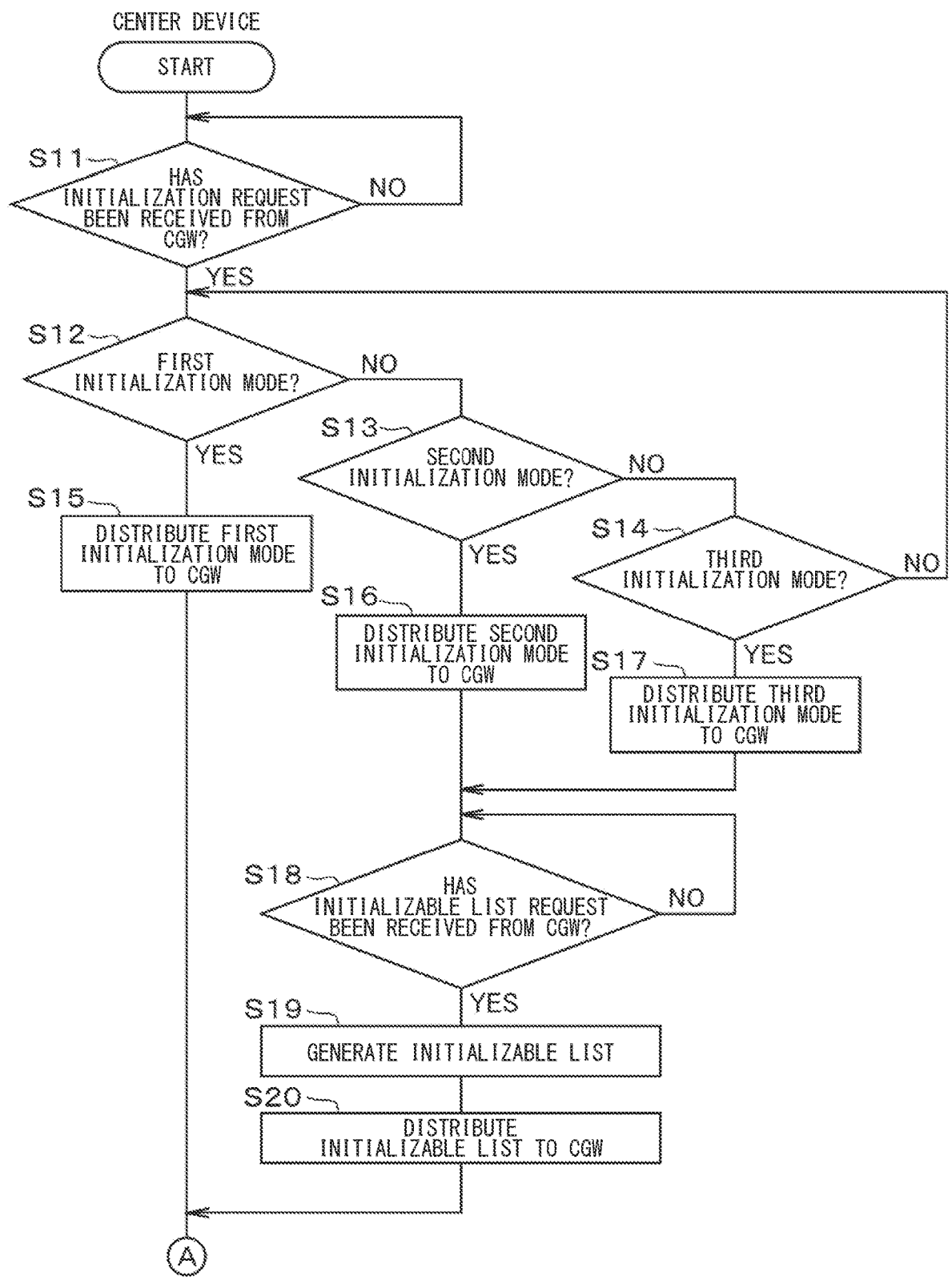
FIG. 33 is a flowchart illustrating a process of the center device.
Figure 34:
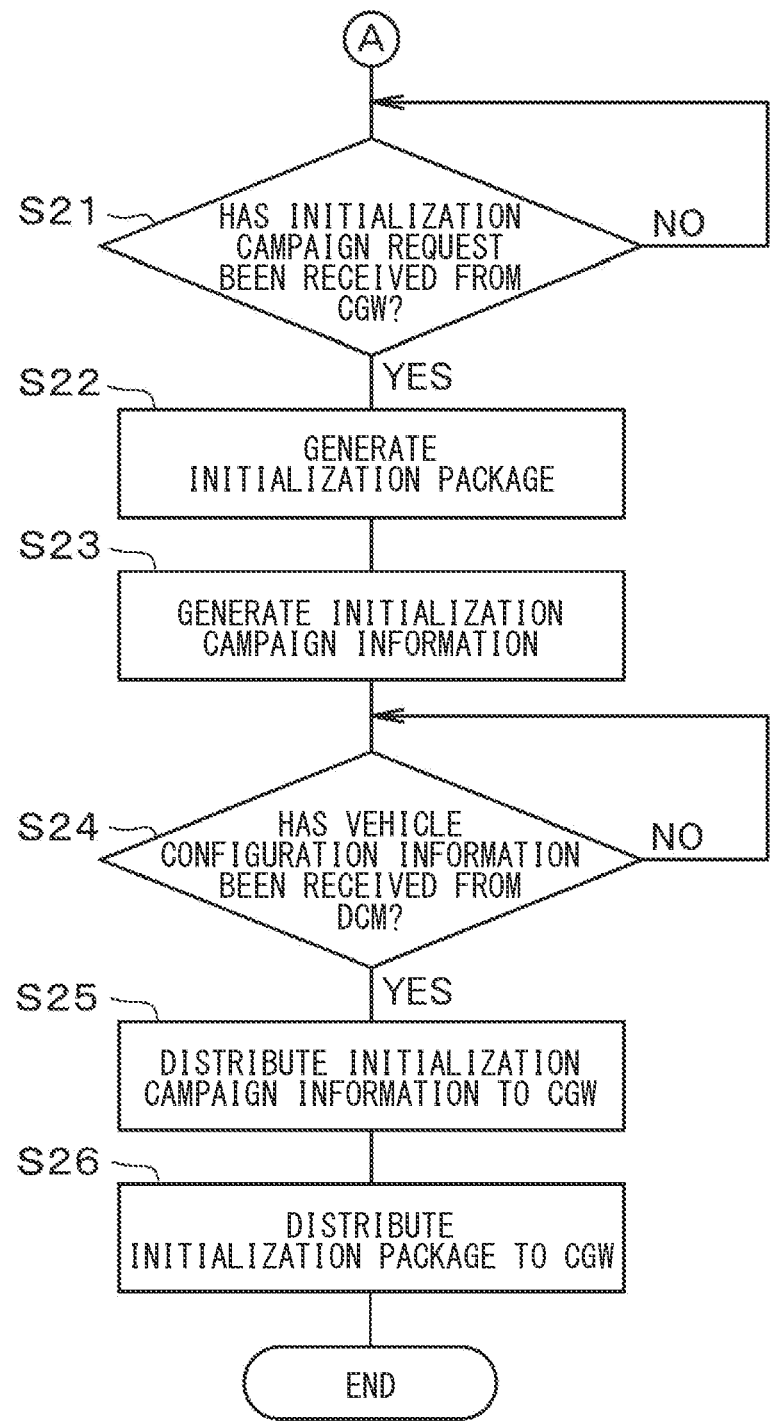
FIG. 34 is a flowchart illustrating a process of the center device.
Figure 35:
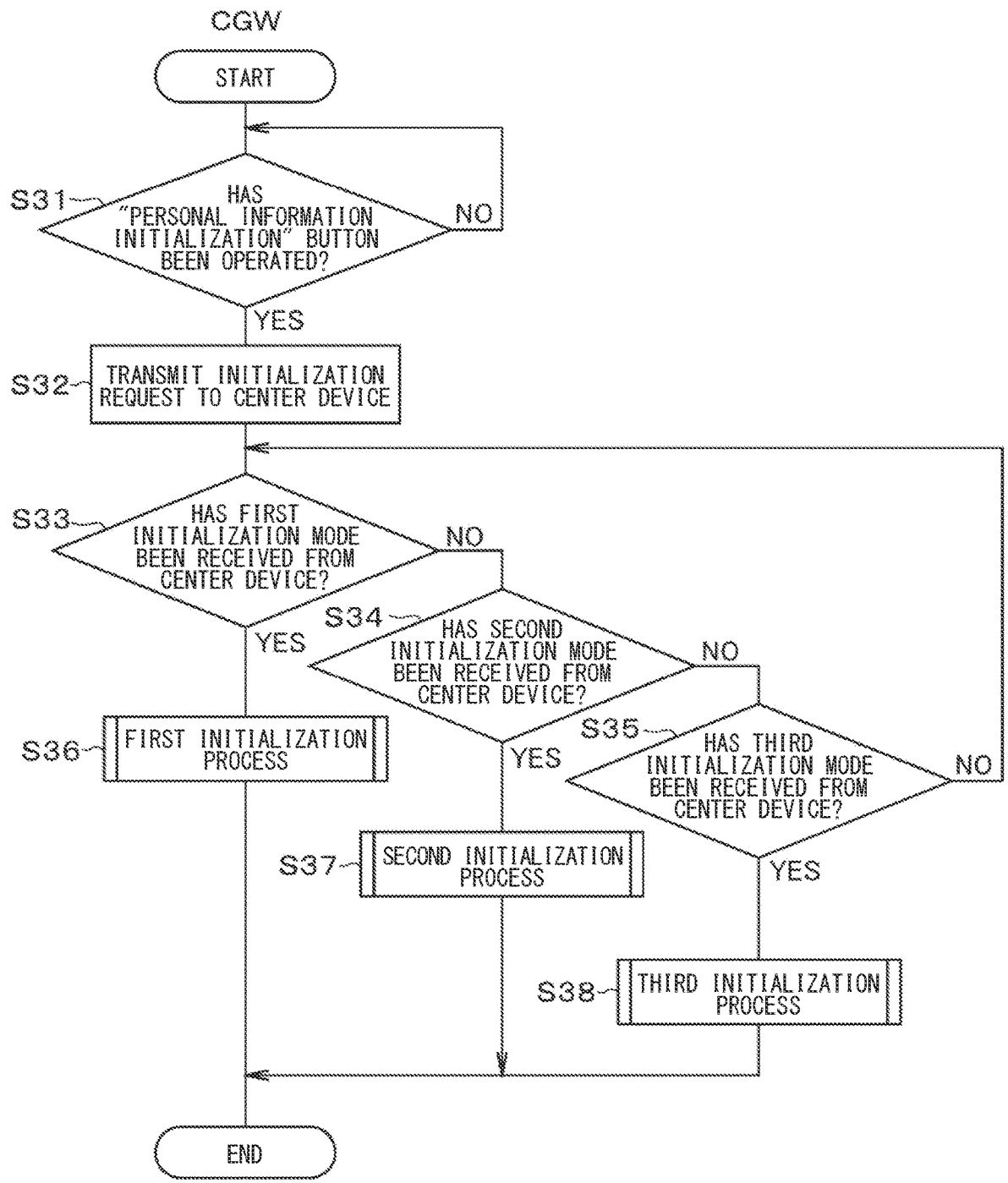
FIG. 35 is a flowchart illustrating a process of a CGW.
Figure 36:
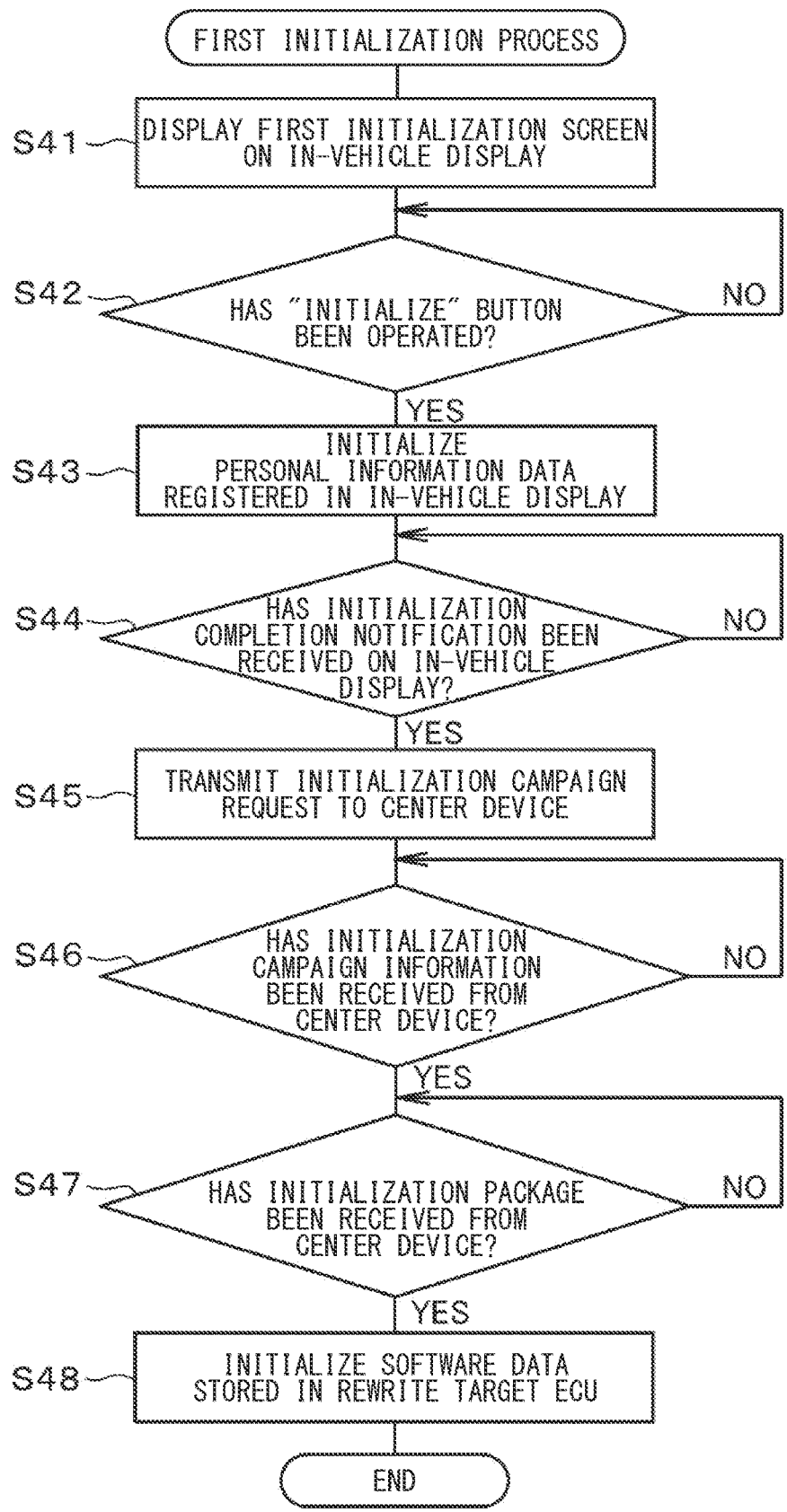
FIG. 36 is a flowchart illustrating a process of the CGW.
Figure 37:
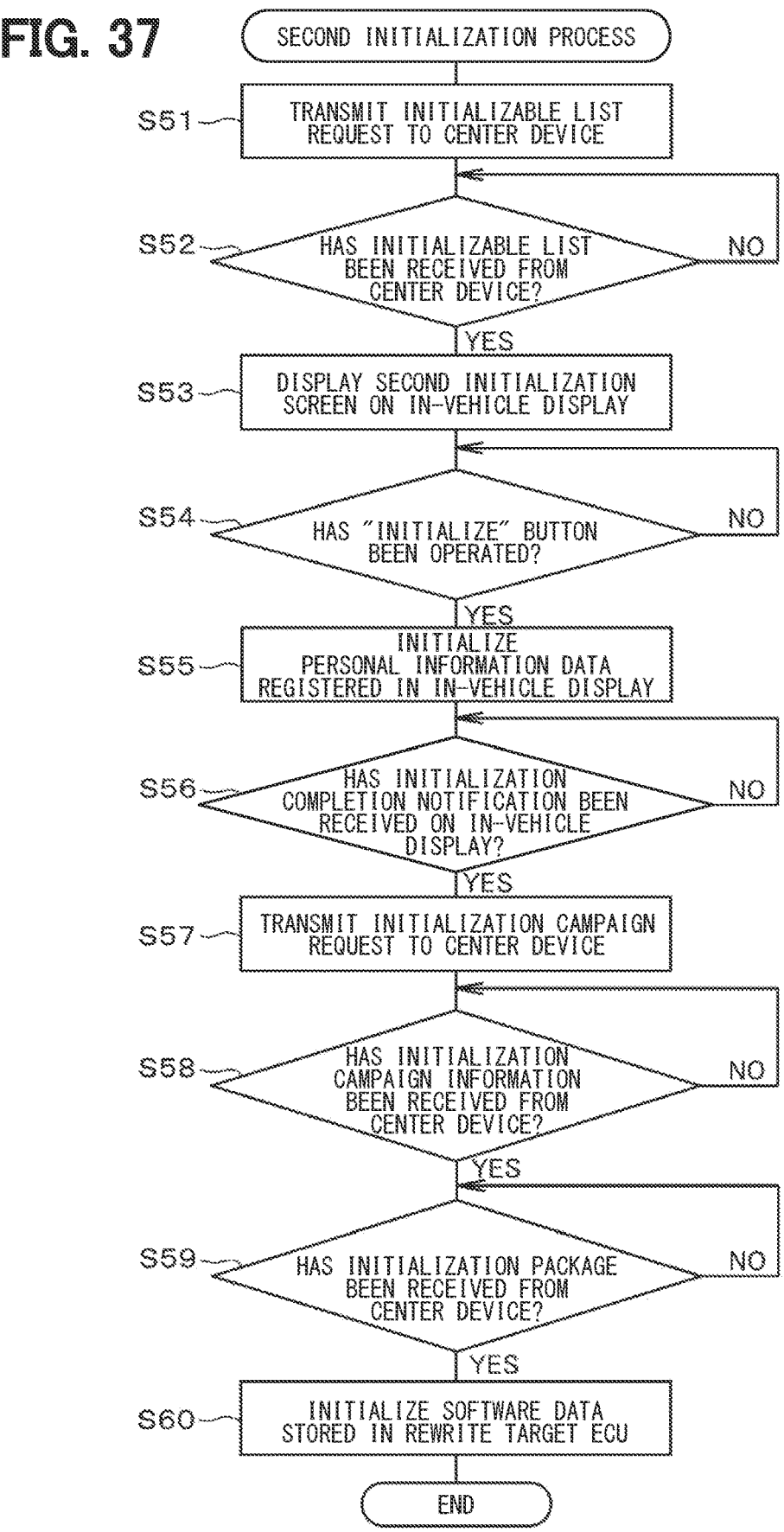
FIG. 37 is a flowchart illustrating a process of the CGW.
Figure 38:
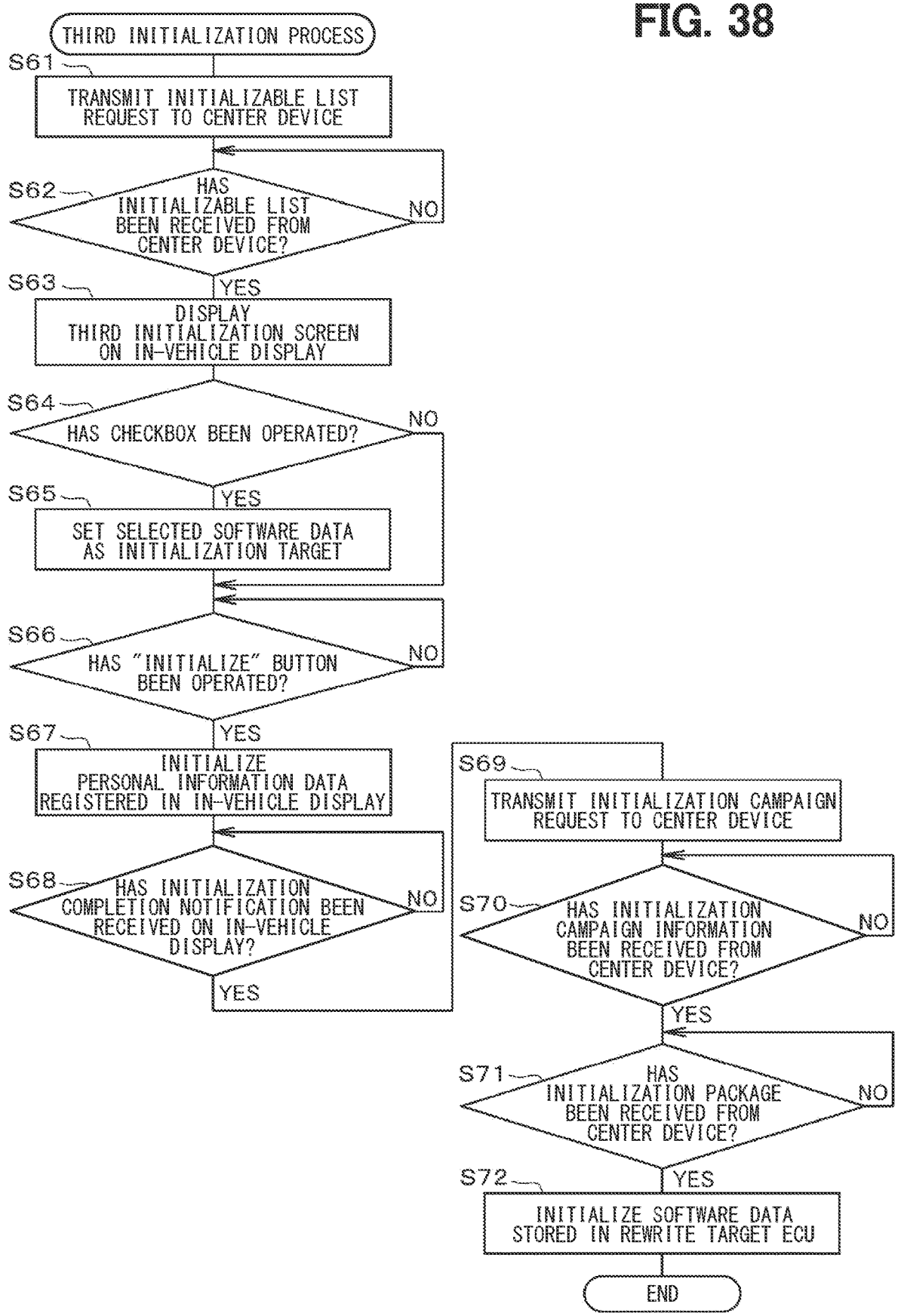
FIG. 38 is a flowchart illustrating a process of the CGW.

Next, a process of distributing the initialization campaign information in the center device 3 will be described with reference to FIGS. 33 and 34. When it is determined that an initialization request has been received from the CGW 14 via the DCM 13 (S11: YES, corresponding to an initialization request reception step), the center device 3 specifies a corresponding initialization mode based on the campaign information and the package distributed in the past to the CGW 14 that has transmitted the initialization request (S12 to S14, corresponding to an initialization target specifying step).

When the center device 3 specifies the first initialization mode (S12: YES), the center device 3 distributes the first initialization mode to the CGW 14 via the DCM 13 (S15). When the center device 3 specifies the second initialization mode (S13: YES), the center device 3 distributes the second initialization mode to the CGW 14 via the DCM 13 (S16). When the center device 3 specifies the third initialization mode (S14: YES), the center device 3 distributes the third initialization mode to the CGW 14 via the DCM 13 (S17).

When it is determined that the second initialization mode or the third initialization mode is distributed to the CGW 14 via the DCM 13 and then an initializable list request is received from the CGW 14 via the DCM 13 (S18: YES), the center device 3 generates an initializable list (S19), and distributes the generated initializable list to the CGW 14 via the DCM 13 (S20).

When it is determined that the initialization campaign request has been received from the CGW 14 via the DCM 13 (S21: YES), the center device 3 generates an initialization package (S22, corresponding to an initialization package generation step), and generates initialization campaign information (S23). After that, when it is determined that the vehicle configuration information has been received from the DCM 13 (S24: YES), the center device 3 distributes the generated initialization campaign information to the CGW 14 via the DCM 13 (S25, corresponding to an initialization campaign information distribution step), and distributes the generated initialization package the CGW 14 via the DCM 13 (S26, corresponding to an initialization package distribution step).

Next, a process of the CGW 14 will be described with reference to FIGS. 35 to 38.

When the CGW 14 determines that the user has operated the "data initialization" button 103*h* on the user registration screen (S31: YES), the CGW 14 causes the DCM 13 to transmit an initialization request to the center device 3 (S32). The CGW 14 determines which initialization mode has been received from the center device 3 via the DCM 13 (S33 to S35). When it is determined that the first initialization mode has been received (S33: YES), the CGW 14 proceeds to the first initialization process (S36), and when it is determined that the second initialization mode has been received (S34: YES), the CGW 14 proceeds to the second initialization process (S37), and when it is determined that the third initialization mode has been received (S35: YES), the CGW 14 proceeds to the third initialization process (S38).

When the CGW 14 proceeds to the first initialization process, the CGW 14 transmits a screen display instruction to the in-vehicle display 7, and displays the first initialization screen 104 on the in-vehicle display 7 (S41). When it is determined that the user has operated the "initialize" button 104a on the first initialization screen 104 (S42: YES), the CGW 14 transmits an initialization instruction to the in-vehicle display 7, and erases and initializes the personal information data registered in the in-vehicle display 7 (S43).

When it is determined that an initialization completion notification has been received from the in-vehicle display 7 (S44: YES), the CGW 14 causes the DCM 13 to transmit an initialization campaign request to the center device 3 (S45). When it is determined that the initialization campaign information has been received from the center device 3 via the DCM 13 (S46: YES, corresponding to an initialization campaign information reception step), and the initialization package has been received from the center device 3 via the DCM 13 (S47: YES, corresponding to an initialization package reception step), the CGW 14 transmits an initialization instruction to the rewrite target ECU 20, and erases or rolls back and initializes the software data stored in the rewrite target ECU 20 (S48, corresponding to an initialization execution step).

When the CGW 14 proceeds to the second initialization process, the CGW 14 causes the DCM 13 to transmit an initializable list request to the center device 3 (S51). When it is determined that the initializable list has been received from the center device 3 via the DCM 13 (S52: YES), the CGW 14 transmits a screen display instruction to the in-vehicle display 7 (S53), and displays the second initialization screen 105 on the in-vehicle display 7. When it is determined that the user has operated the "initialize" button 105a on the second initialization screen 105 (S54: YES), the CGW 14 transmits an initialization instruction to the in-vehicle display 7 (S55), and erases and initializes the personal information data registered in the in-vehicle display 7.

When it is determined that an initialization completion notification has been received from the in-vehicle display 7 (S56: YES), the CGW 14 causes the DCM 13 to transmit an initialization campaign request to the center device 3 (S57). When it is determined that the initialization campaign information has been received from the center device 3 via the DCM 13 (S58: YES, corresponding to an initialization campaign information reception step), and the initialization package has been received from the center device 3 via the DCM 13 (S59: YES, corresponding to an initialization package reception step), the CGW 14 transmits the initialization instruction to the rewrite target ECU 20, and erases or rolls back and initializes the software data stored in the rewrite target ECU 20 (S60, corresponding to an initialization execution step).

When the CGW 14 proceeds to the third initialization process, the CGW 14 causes the DCM 13 to transmit an initializable list request to the center device 3 (S61). When it is determined that the initializable list has been received from the center device 3 via the DCM 13 (S62: YES), the CGW 14 transmits a screen display instruction to the in-vehicle display 7 (S63), and displays the third initialization screen 106 on the in-vehicle display 7. When it is determined that the user has operated the checkbox 106c on the third initialization screen 106 (S64: YES), the selected software data is set as an initialization target (S65), and when it is determined that the user has operated the "initialize" button 106a (S66: YES), an initialization instruction is transmitted to the in-vehicle display 7 (S67), and the personal information data registered in the in-vehicle display 7 is erased and initialized.

When it is determined that an initialization completion notification has been received from the in-vehicle display 7 (S68: YES), the CGW 14 causes the DCM 13 to transmit an initialization campaign request to the center device 3 (S69). When it is determined that the initialization campaign information has been received from the center device 3 via the DCM 13 (S70: YES, corresponding to an initialization campaign information reception step), and the initialization package has been received from the center device 3 via the DCM 13 (S71: YES, corresponding to an initialization package reception step), the CGW 14 transmits the initialization instruction to the rewrite target ECU 20, and erases or rolls back and initializes the software data stored in the rewrite target ECU 20 (S72, corresponding to an initialization execution step).

Figure 39:
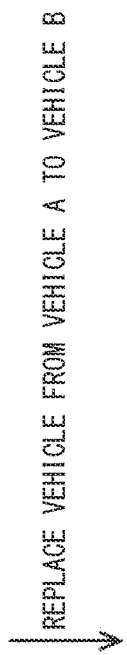
FIG. 39 is a diagram illustrating license information.

When the user replaces the vehicle, the center device 3 updates software license information correlated with each user. When a user A replaces a vehicle from a vehicle A to a vehicle B, and the user A makes a request for initialization of personal information data registered in the in-vehicle display 7 of the vehicle A or software data stored in the rewrite target ECU 20, as described above, the center device 3 distributes the initialization campaign information to the vehicle A to initialize the data, and as illustrated in FIG. 39, updates license information of software purchased by the user Awhile owning the vehicle A, and thus transfers the license of the software purchased by the user A while owning the vehicle A from the vehicle A to the vehicle B. For example, software A that has been purchased and used while owning vehicle A can be used in vehicle B, and software B that has been purchased while owning vehicle A but has not been used can also be used in vehicle B.

As described above, according to the present embodiment, the following advantageous effects can be achieved.

When a data initialization request is received by the center device 3, initialization target data is specified, the initialization campaign information and the initialization package are distributed, and when the initialization campaign information and the initialization are received from the center device by the master device 12, the initialization target data is initialized based on the received initialization campaign information and initialization package. Initialization campaign information and initialization package similar to a package including campaign information and update data related to program update are defined, and the initialization campaign information and the initialization package are transmitted and received between the center device 3 and the master device 12. Therefore, data stored on the vehicle side can be appropriately initialized.

Figure 26:
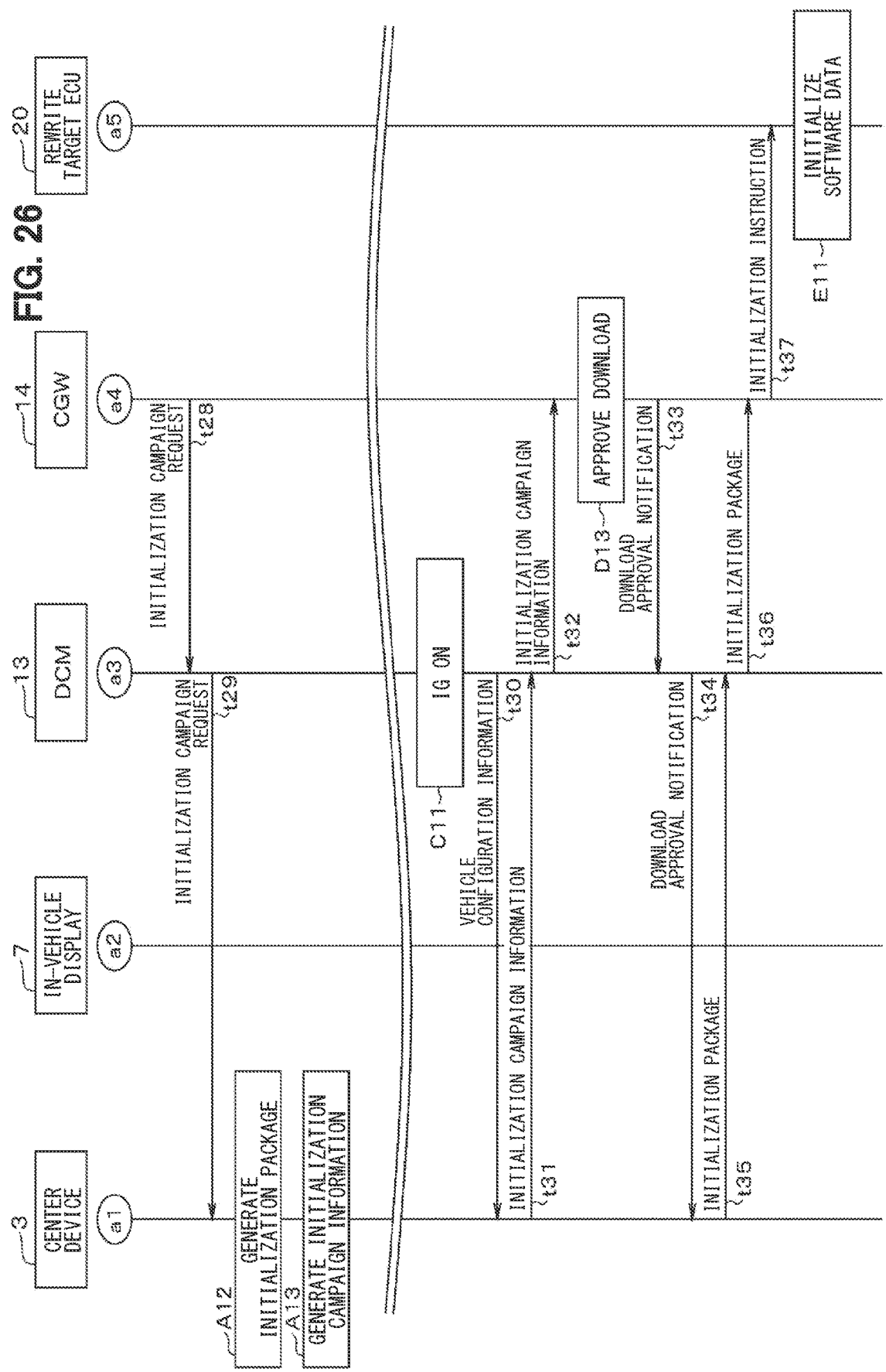
FIG. 26 is a diagram illustrating a processing flow.
Figure 29:
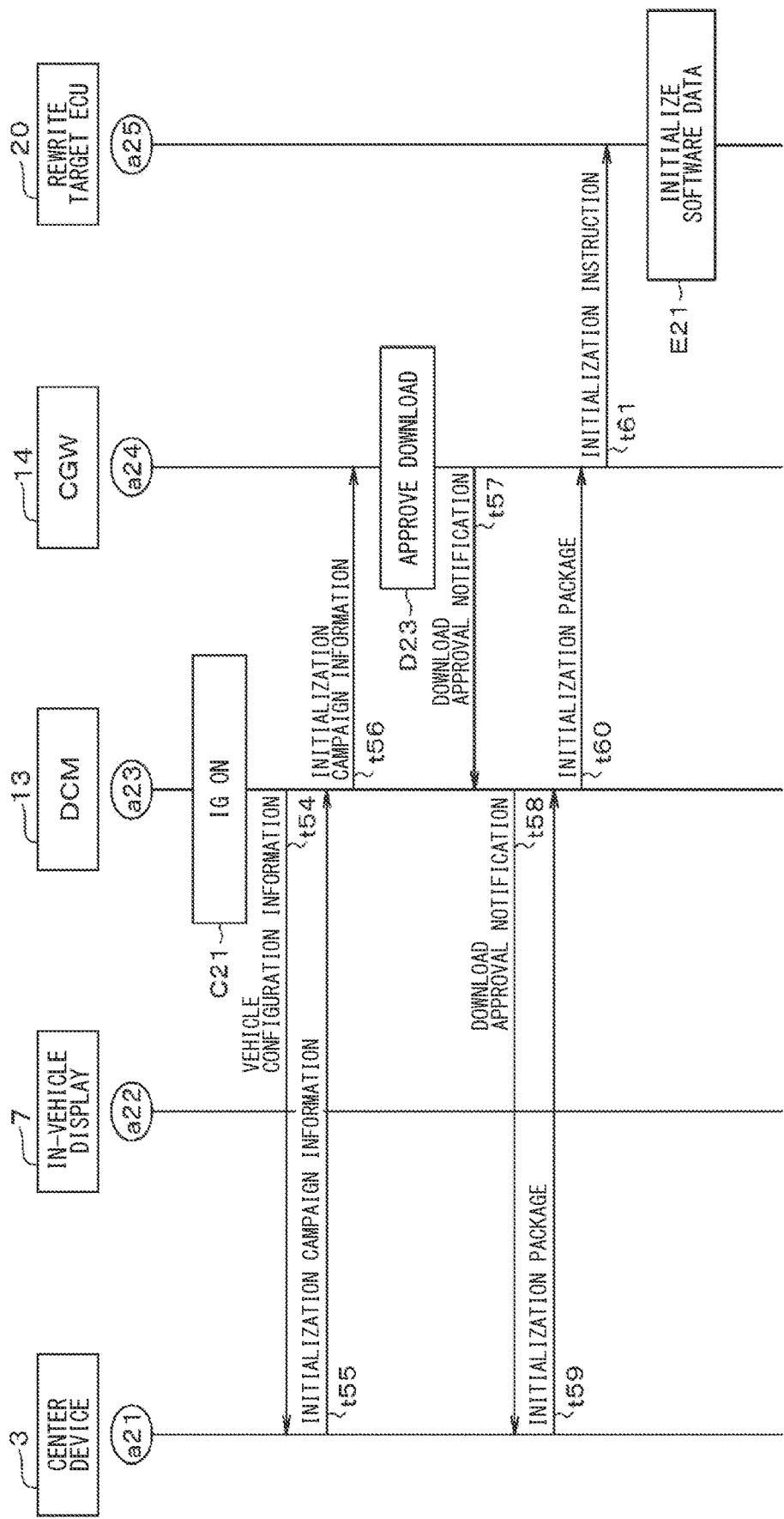
FIG. 29 is a diagram illustrating a processing flow.
Figure 32:
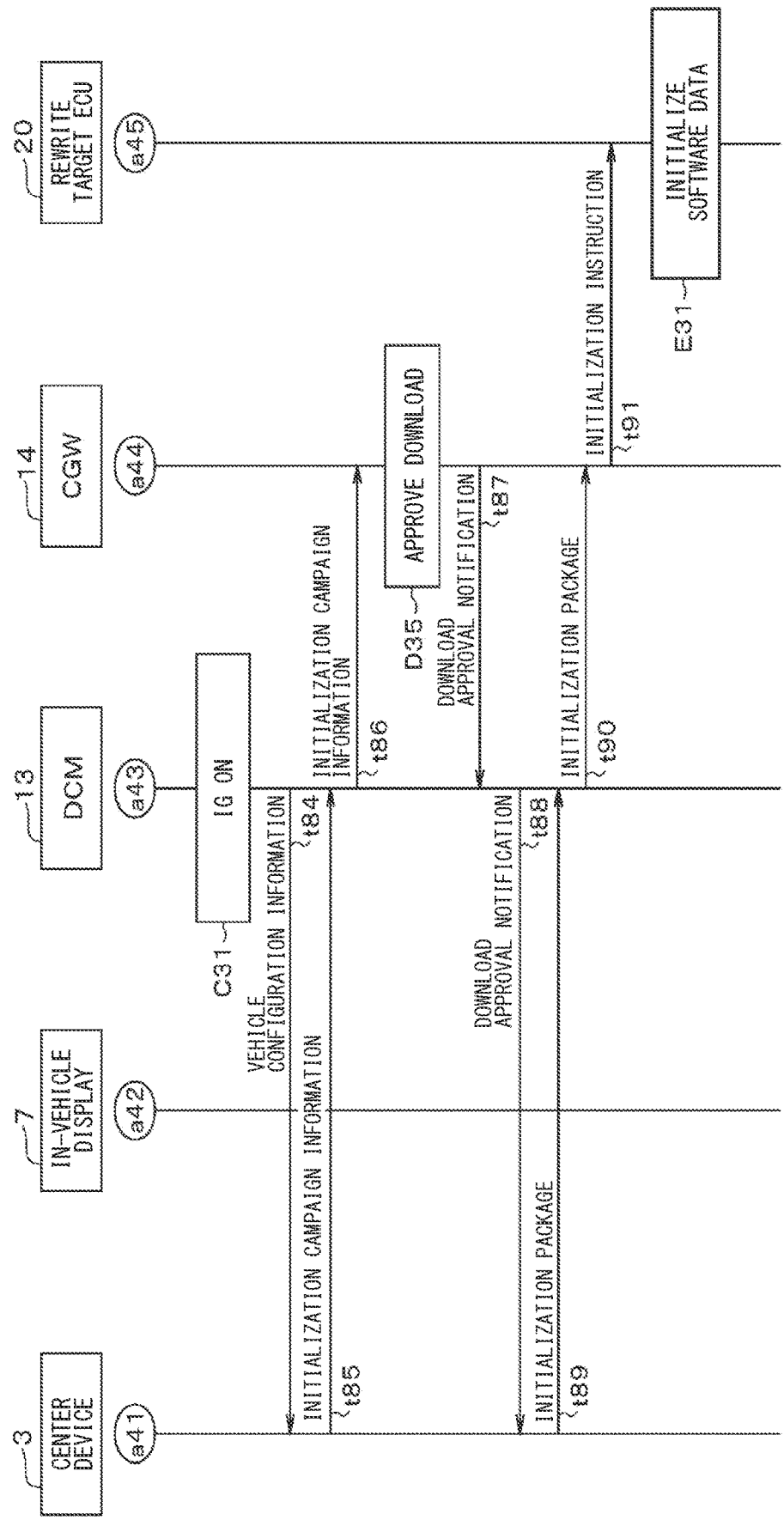
FIG. 32 is a diagram illustrating a processing flow.

That is, in the center device 3, similarly to the process from distribution of the campaign information related to the program update described in FIG. 10 to distribution of the package, a process from distribution of the initialization campaign information described in FIGS. 26, 29, and 32 to distribution of the initialization package is performed, and thus it is possible to easily realize a structure of initializing data stored on the vehicle side without defining new initialization campaign information and initialization package.

In the center device 3, the initialization package is generated such that software data in the latest recall version remains on the vehicle side. If the software data in the latest recall version is erased from the vehicle side when the vehicle is bought, sold, or transferred, it may not be possible to guarantee a vehicle behavior, but if the software data in the latest recall version remains on the vehicle side, it is possible to ensure an appropriate vehicle behavior.

In the center device 3, an initialization package is generated such that software data of the free contents remain on the vehicle side. When the vehicle is bought, sold, or transferred, the software data of the free contents remain on the vehicle side, and thus a new owner can benefit from the free contents without causing any disadvantage to an old owner.

In the center device 3, an initialization package is generated such that software data of the paid contents are erased from the vehicle side. When the vehicle is bought, sold, or transferred, the software data of the paid contents is erased from the vehicle side, and thus it is possible to avoid a situation in which a new owner is disadvantaged.

In the center device 3, the data structure of the initialization package and the data structure of the package related to the program update are the same, and the data structure of the initialization campaign information and the data structure of the campaign information related to the program update are the same. By using the data structure of the package or the campaign information related to the program update, it is possible to easily realize a structure of initializing data stored on the vehicle side without defining new data structure of the initialization package or the initialization campaign information.

In the center device 3, the data structure of the specification data of the initialization package and the data structure of the specification data of the package related to the program update are the same. By using the data structure of the specification data of the package related to the program update, it is possible to easily realize a structure of initializing data stored on the vehicle side without defining new data structure of the specification data of the initialization package.

In the center device 3, the initialization package including the erase program or the erase command is distributed, and thus initialization target data is initialized by erasing the data. By erasing the data, the data stored in the memory area can be erased and the memory area in which the data is stored can be emptied.

In the center device 3, the initialization package including the rollback program or the rollback command is distributed, and thus initialization target data is initialized by rolling back the data. By rolling back the data, the data stored in the memory area can be erased, and data in a version older than that of the erased data can be written into the memory area in which the data is stored.

Although the present disclosure has been described in accordance with the embodiments, it is understood that the present disclosure is not limited to the embodiments and structures described above. The present disclosure includes various modification examples or variations within the scope of equivalents. Various combinations or forms as well as other combinations or forms including only one element, one or more elements, or one or less elements, fall within the scope or the spirit of the present disclosure.

Although the configuration in which the user first initializes the personal information data registered in the in-vehicle display 7 and then initializes the software data stored in the rewrite target ECU 20 by performing the initialization operation has been exemplified, an initialization operation for initializing the personal information data registered in the in-vehicle display 7 and an initialization operation for initializing the software data stored in the rewrite target ECU 20 may be set as separate operations. That is, a user who initializes the personal information data registered in the in-vehicle display 7 and a user who initializes the software data stored in the rewrite target ECU 20 may be different.

The control unit and the method described in the present disclosure may be realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method described in the present disclosure may be realized by one or more dedicated computers configured by a combination of a processor and a memory programmed to execute one or more functions and a processor configured by one or more hardware logic circuits. The computer program may also be stored on a computer readable and non-transitory tangible recording medium as instructions executed by a computer.

The invention claimed is:

1. A vehicle electronic control system, comprising:
   a center device that is configured to distribute campaign information and a package including update data related to program update; and
   a vehicle master device that is configured to control program update of a rewrite target electronic control unit (ECU) based on the campaign information and the package received from the center device, wherein
   the center device includes:
      an initialization request receiving unit that is configured to receive an initialization request for data stored on a vehicle side;
      an initialization target specifying unit that is configured to specify initialization target data when the data initialization request is received by the initialization request receiving unit;
      an initialization campaign information distribution unit that is configured to distribute initialization campaign information corresponding to an initialization package for initializing the initialization target data; and
      an initialization package distribution unit that is configured to distribute the initialization package, and
   the vehicle master device includes:
      an initialization campaign information receiving unit that is configured to receive the initialization campaign information from the center device;
      an initialization package receiving unit that is configured to receive the initialization package from the center device; and
      an initialization execution unit that is configured to initialize the initialization target data based on the initialization campaign information and the initialization package, wherein
      the initialization package distribution unit is further configured to distribute the initialization package including an erase program or an erase command, and
      the initialization execution unit is further configured to initialize the initialization target data by erasing the initialization target data.

2. The vehicle electronic control system according to claim 1, wherein
   the initialization target specifying unit is further configured to specify software data stored in the rewrite target ECU as the initialization target data.

3. The vehicle electronic control system according to claim 1, wherein the center device further includes an initialization package generation unit that is configured to generate the initialization package.

4. The vehicle electronic control system according to claim 3, wherein
the initialization package generation unit is further configured to generate the initialization package such that software data related to a latest recall version remains on the vehicle side.

5. The vehicle electronic control system according to claim 3, wherein
the initialization package generation unit is further configured to generate the initialization package such that software data related to a free content remains on the vehicle side.

6. The vehicle electronic control system according to claim 3, wherein
the initialization package generation unit is further configured to generate the initialization package such that software data related to a paid content is erased from the vehicle side.

7. The vehicle electronic control system according to claim 1, wherein
the initialization package has a same data structure as a data structure of the package related to the program update, and
the initialization campaign information has a same data structure as a data structure of the campaign information related to the program update.

8. The vehicle electronic control system according to claim 1, wherein
each of the package related to the program update and the initialization package includes specification data, and
the specification data of the initialization package has a same data structure as a data structure of the specification data of the package related to the program update.

9. The vehicle electronic control system according to claim 1, wherein
the center device further includes:
a vehicle configuration information acquisition unit that is configured to acquire vehicle configuration information, and
a storage unit that is configured to store a distribution history of campaign information for each vehicle, and
when the data initialization request is received by the initialization request receiving unit, the initialization target specifying unit is further configured to:
refer to the vehicle configuration information and the distribution history of the campaign information for each vehicle; and
specify the initialization target data.

10. The vehicle electronic control system according to claim 9, wherein
the center device further includes an initialization target candidate specifying unit that is configured to specify initialization target candidate data,
the initialization target candidate specifying unit is further configured to:
refer to the vehicle configuration information and the distribution history of the campaign information for each vehicle; and
specify the initialization target candidate data when the data initialization request is received by the initialization request receiving unit, and the initialization target specifying unit is further configured to specify the initialization target data from the initialization target candidate data.

11. The vehicle electronic control system according to claim 10, further comprising:
a display terminal that is configured to allow a user to perform a selection operation for the initialization target data, wherein
the initialization target specifying unit is further configured to specify the initialization target data from the initialization target candidate data based on the selection operation performed by the user on the display terminal.

12. The vehicle electronic control system according to claim 1, wherein
the center device further includes an initialization campaign information generation unit that is configured to generate, when the initialization target data is specified by the initialization target specifying unit, initialization campaign information for designating initialization of the specified initialization target data, and
the initialization campaign information distribution unit is further configured to distribute the initialization campaign information generated by the initialization campaign information generation unit.

13. The vehicle electronic control system according to claim 1, wherein
the center device further includes:
a storage unit that is configured to store a plurality of pieces of initialization campaign information, and
an initialization campaign information selection unit that is configured to select, when the initialization target data is specified by the initialization target specifying unit, initialization campaign information for designating initialization of the specified initialization target data from among the plurality of pieces of initialization campaign information stored in the storage unit, and
the initialization campaign information distribution unit is further configured to distribute the initialization campaign information selected by the initialization campaign information selection unit.

14. The vehicle electronic control system according to claim 1, wherein
the center device further includes:
a storage unit that is configured to store software license information; and
a license information update unit that is configured to update the software license information stored in the storage unit after the initialization campaign information distribution unit distributes the initialization campaign information.

15. A vehicle electronic control system, comprising:
a center device that is configured to distribute campaign information and a package including update data related to program update; and
a vehicle master device that is configured to control program update of a rewrite target electronic control unit (ECU) based on the campaign information and the package received from the center device, wherein
the center device includes:
an initialization request receiving unit that is configured to receive an initialization request for data stored on a vehicle side;

an initialization target specifying unit that is configured to specify initialization target data when the data initialization request is received by the initialization request receiving unit;

an initialization campaign information distribution unit that is configured to distribute initialization campaign information corresponding to an initialization package for initializing the initialization target data; and an initialization package distribution unit that is configured to distribute the initialization package, and the vehicle master device includes:

an initialization campaign information receiving unit that is configured to receive the initialization campaign information from the center device;

an initialization package receiving unit that is configured to receive the initialization package from the center device; and an initialization execution unit that is configured to initialize the initialization target data based on the initialization campaign information and the initialization package, wherein the initialization campaign information distribution unit is further configured to distribute the initialization package including a rollback program or a rollback command, and the initialization execution unit is further configured to initialize the initialization target data by erasing the initialization target data and then rolling back data before the initialization target data is written.

16. A data initialization method for a vehicle electronic control system including: a center device that is configured to distribute campaign information and a package including update data related to program update; and a vehicle master device that is configured to control program update of a rewrite target electronic control device based on the campaign information and the package received from the center device, the data initialization method comprising:

receiving, by the center device, an initialization request for data stored on a vehicle side;

specifying, by the center device, initialization target data when the data initialization request is received;

distributing, by the center device, initialization campaign information corresponding to an initialization package for initializing the initialization target data;

distributing, by the center device, the initialization package;

receiving, by the vehicle master device, the initialization campaign information from the center device;

receiving, by the vehicle master device, the initialization package from the center device; and initializing, by the vehicle master device, the initialization target data based on the initialization campaign information and the initialization package, wherein distributing the initialization package further includes distributing, by the center device, the initialization package including an erase program or an erase command, and initializing the initialization target data further includes initializing, by the vehicle master device, the initialization target data by erasing the initialization target data.

17. A center device that is configured to distribute campaign information and a package including update data related to program update, the center device comprising:

an initialization request receiving unit that is configured to receive an initialization request for data stored on a vehicle side;

an initialization target specifying unit that is configured to specify initialization target data when the data initialization request is received by the initialization request receiving unit;

an initialization campaign information distribution unit that is configured to distribute initialization campaign information corresponding to an initialization package for initializing the initialization target data; and an initialization package distribution unit that is configured to distribute the initialization package, wherein the initialization package distribution unit is further configured to distribute the initialization package including an erase program or an erase command to cause the vehicle side to initialize the initialization target data by erasing the initialization target data.

18. A vehicle master device that is configured to control program update of a rewrite target electronic control unit based on campaign information and a package received from a center device, the vehicle master device comprising:

an initialization campaign information receiving unit that is configured to receive initialization campaign information from the center device;

an initialization package receiving unit that is configured to receive an initialization package from the center device; and an initialization execution unit that is configured to initialize initialization target data based on the initialization campaign information and the initialization package, wherein the initialization package includes an erase program or an erase command, and the initialization execution unit is further configured to initialize the initialization target data by erasing the initialization target data.

19. A non-transitory computer-readable storage medium storing an initialization package distribution program for a center device that is configured to distribute campaign information and update data related to program update, the initialization package distribution program causing the center device to:

receive an initialization request for data stored on a vehicle side;

specify initialization target data when the data initialization request is received;

distribute initialization campaign information corresponding to an initialization package for initializing the initialization target data; and distribute the initialization package;

wherein the initialization package distribution program further causes the center device to distribute the initialization package including an erase program or an erase command to cause the vehicle side to initialize the initialization target data by erasing the initialization target data.

20. A non-transitory computer-readable storage medium storing a data initialization program for a vehicle master device that is configured to control program update of a rewrite target electronic control unit based on campaign information and a package received from a center device, the data initialization program causing the vehicle master device to:

receive initialization campaign information from the center device;

receive an initialization package from the center device; and initialize initialization target data based on the initialization campaign information and the initialization package, wherein the initialization package includes an erase program or an erase command, and the data initialization program further causes the vehicle master device to initialize the initialization target data by erasing the initialization target data.

21. A method for a center device that is configured to distribute campaign information and a package including update data related to program update, the method comprising:

receiving an initialization request for data stored on a vehicle side;

specifying initialization target data when the data initialization request is received;

distributing initialization campaign information corresponding to an initialization package for initializing the initialization target data; and distributing the initialization package;

wherein distributing the initialization package further includes distributing the initialization package including an erase program or an erase command to cause the vehicle side to initialize the initialization target data by erasing the initialization target data.

22. A vehicle electronic control system, comprising:

a center device that is configured to distribute campaign information and a package including update data related to program update; and a vehicle master device that is configured to control program update of a rewrite target electronic control unit (ECU) based on the campaign information and the package received from the center device, wherein the center device includes at least one first processor and at least one first memory storing first computer program code, the first computer program code, when executed by the at least one first processor, causing the at least one first processor to:

receive an initialization request for data stored on a vehicle side;

specify initialization target data upon receiving the data initialization request;

distribute initialization campaign information corresponding to an initialization package for initializing the initialization target data; and distribute the initialization package, and the vehicle master device includes at least one second processor and at least one second memory storing second computer program code, the second computer program code, when executed by the at least one second processor, causing the at least one second processor to:

receive the initialization campaign information from the center device;

receive the initialization package from the center device; and initialize the initialization target data based on the initialization campaign information and the initialization package, wherein the first computer program code further causes the at least one first processor to distribute the initialization package including an erase program or an erase command, and the second computer program code further causes the at least one second processor to initialize the initialization target data by erasing the initialization target data.

* * * * *